US012197226B2

(12) United States Patent
Wiencrot

(10) Patent No.: US 12,197,226 B2
(45) Date of Patent: Jan. 14, 2025

(54) SELF-PROPELLED DEVICE WITH COLOR DIFFERENTIATED FUNCTIONS

(71) Applicant: Sphero, Inc., Boulder, CO (US)

(72) Inventor: Jeff Wiencrot, Boulder, CO (US)

(73) Assignee: Sphero, Inc., Greenville, TX (US)

( * ) Notice: Subject to any disclaimer, the term of this patent is extended or adjusted under 35 U.S.C. 154(b) by 24 days.

(21) Appl. No.: 17/590,361

(22) Filed: Feb. 1, 2022

(65) Prior Publication Data
US 2022/0244738 A1    Aug. 4, 2022

Related U.S. Application Data

(60) Provisional application No. 63/144,395, filed on Feb. 1, 2021.

(51) Int. Cl.
*G05D 1/00*    (2024.01)
*G01J 3/50*    (2006.01)

(52) U.S. Cl.
CPC .............. *G05D 1/0234* (2013.01); *G01J 3/50* (2013.01)

(58) Field of Classification Search
CPC ............................. G05D 1/02; G05D 1/0234
USPC ................................................. 701/28, 23, 1
See application file for complete search history.

(56) References Cited

U.S. PATENT DOCUMENTS

2015/0057802 A1*   2/2015   Kroyan ................. B25J 9/1684
                                                        901/1
2018/0104609 A1*   4/2018   Musliner .............. A63H 18/021

FOREIGN PATENT DOCUMENTS

CN          211073602 U       7/2020

OTHER PUBLICATIONS

Balaton, et al. "Teaching kinematics with OZOBOT: a proposal to help improve student's graph interpretation skills," Phys. Educ. 55 (2020) 6 pages.
Office Action issued Oct. 2, 2024 in EP Appl. No. 22709081.8, (15 pages).

* cited by examiner

*Primary Examiner* — Jamares Q Washington

(57) ABSTRACT

Systems and methods are presented for operating a self-propelled device. In examples, an indication of a surface color on which the self-propelled device operates is received from one or more optical sensors. A color transition from a first color to a second color may be determined based on the received indication. Based on the determined color transition, an activity may be determined. For example, an activity may cause the self-propelled device to move, emit a sound, or illuminate a light, such as an LED. The determined activity may then be performed. In some examples, a hysteresis band may limit the effects of noise and other variations in the color signal. Accordingly, a color transition may occur when color values associated with the surface color indicated are within a first area but not within a second area.

20 Claims, 15 Drawing Sheets

| COLOR_ID | DRIVE_FUNCTION | AUDIO_FUNCTION | LIGHT_FUNCTION | X_FUNCTION |
|---|---|---|---|---|
| GREEN_X | 90 DEGREE RIGHT | TUNE_ID_A | LIGHT_FUNCTION_A | ACTION_B |
| RED_Y | 30 DEGREE RIGHT | TUNE_ID_B | LIGHT_FUNCTION_B | ACTION_C |
| ... | | | | |
| BLUE_Z | 90 DEGREE LEFT | TUNE_ID_A | LIGHT_FUNCTION_C | ACTION_C |

*Fig. 5*

SELF-PROPELLED DEVICE WITH COLOR DIFFERENTIATED FUNCTIONS

CROSS-REFERENCE TO RELATED APPLICATIONS

This application claims priority to U.S. Provisional Application Ser. No. 63/144,395, filed Feb. 1, 2021, and titled "SELF-PROPELLED DEVICE WITH COLOR DIFFERENTIATED FUNCTIONS" the disclosure of which is incorporated herein by reference in its entirety.

BACKGROUND

Many self-propelled devices receive information from their surroundings using proximity sensors to identify and avoid potential obstacles in their path. However, detecting a change in the self-propelled device's operating environment and then acting based on the change is difficult when considering the amount of noise that may be included with data provided from a sensor. While data filtering works in some environments, such filtering may remove important information needed by the self-propelled device to operate effectively.

It is with respect to these and other general considerations that embodiments have been described. Also, although relatively specific problems have been discussed, it should be understood that the embodiments should not be limited to solving the specific problems identified in the background.

SUMMARY

In examples, a self-propelled device may determine a surface color of a surface on which it operates, and upon detecting a change in the surface color, perform a specified function or activity. For example, one or more colored tiles, or cards, may be placed on a surface. Based on a color of the tile, the self-propelled device may perform one or more activities. In examples, an optical sensor of the self-propelled device may provide surface color information to a control system. The control system may determine that the self-propelled device is operating on a red tile. Accordingly, an activity associated with the red tile determined; such activity may be to move the self-propelled device in a linear direction. Continuing with the above example, the self-propelled device moves in a substantially linear direction and then encounters another tile. The color of the other tile may be associated with an activity to turn right ninety degrees and an activity to move in a substantially linear direction after turning right ninety degrees. The self-propelled device turns right ninety degrees and then moves in a substantially linear direction. The self-propelled device then encounters a tile indicating that the self-propelled device is to dance and play music. Accordingly, the self-propelled device plays music and moves in a dance-like motion.

Aspects of the present disclosure are directed to a method for operating a self-propelled device. The method may include receiving, from an optical sensor of the self-propelled device, an indication of a surface color on which the self-propelled device operates, determining that a color transition has occurred from a first color to a second color based on the received indication, determining an activity associated with the second color, and performing the activity associated with the second color.

At least one aspect of the present disclosure is directed to a self-propelled device. The self-propelled device includes an optical sensor configured to detect a color of a surface on which the self-propelled device operates; at least one motor coupled to a plurality of wheels; and a control system coupled to the optical sensor and the at least one motor, the control system configured to receive from the optical sensor, an indication of a surface color of a surface on which the self-propelled device operates, determine that a color transition has occurred from a first color to a second color based on the received indication, determine an activity associated with the second color, and performing the activity associated with the second color, and enable the at least one motor to move the self-propelled device.

At least one aspect of the present disclosure is directed to a method for operating a self-propelled device. The method may include receiving, from an optical sensor of the self-propelled device, an indication of a surface color of a surface on which the self-propelled device operates, determining that a color transition has occurred from a first color to a second color based on the received indication, determining if color values received from the optical sensor are within a first area or within a second area in a color space, wherein the second area is a hysteresis band surrounding the first area, determining that the color transition occurred when the color values are within the first area, and performing an activity based on the second color.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 5 depicts an example color and activity table in accordance with examples of the present disclosure.

DETAILED DESCRIPTION

Figure 1:
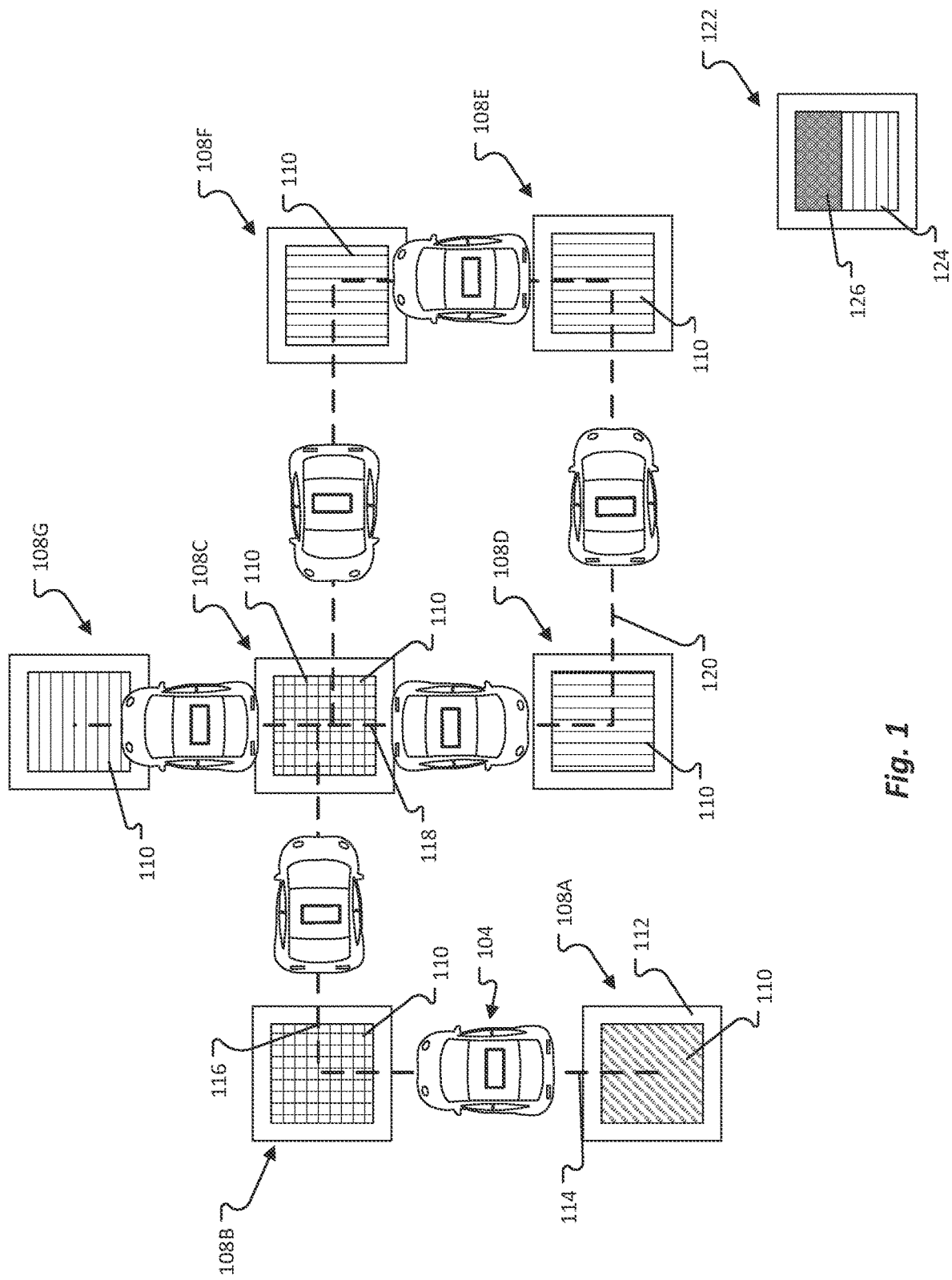
FIG. 1 depicts a self-propelled device in accordance with examples of the present disclosure.

In the following detailed description, references are made to the accompanying drawings that form a part hereof and which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

A self-propelled device may move dependent upon its surroundings. In examples, a self-propelled device may determine a surface color of a surface on which it operates, and upon detecting a change in the surface color, perform a specified function or activity. For example, one or more colored tiles, or cards, may be placed on a surface. Based on a color of the tile, the self-propelled device may perform one or more activities. In examples, an optical sensor of the self-propelled device may provide surface color information to a control system. The control system may determine that the self-propelled device is operating on a red tile. Accordingly, an activity associated with the red tile determined; such activity may be to move the self-propelled device in a linear direction. Continuing with the above example, the self-propelled device moves in a substantially linear direction and then encounters another tile. The color of the other tile may be associated with an activity to turn right ninety degrees and an activity to move in a substantially linear direction after turning right ninety degrees. The self-propelled device turns right ninety degrees and then moves in a substantially linear direction. The self-propelled device then encounters a tile indicating that the self-propelled device is to dance and play music. Accordingly, the self-propelled device plays music and moves in a dance-like motion.

However, detecting reliable color transitions based on tile color may be difficult because such transitions may depend on tile color variations, noise, and transitions between flooring surfaces and tiles. Accordingly, a transition from a hardwood floor may be difficult to detect if the tile includes an orange color. To counter the effects of noise and, in some instances, tile color variations, examples of the present disclosure implement a hysteresis band to limit color transition detections due to noise. In addition, to ensure that a color transition is a color transition that is occurring on a tile, examples of the present disclosure detect color transitions based on color value instability, where the color space that a number of color measurements occupy over a given distance is relatively small compared to the color space that is occupied during a color transition. In examples, the color space may be a shape, such a circle that contains color measurements. In some examples, a measure of the color space may be a diameter, radius, area, or other measurement associated with a circle.

FIG. 1 depicts a self-propelled device 104 in accordance with examples of the present disclosure. Though the self-propelled device 104 is illustrated in the form of a small automobile, the self-propelled device 104 may take many forms, including but not limited to a car, an aircraft, a boat, or a spherical ball. The self-propelled device 104 can be configured to move amongst a plurality of tiles 108, where each of the tiles 108 represents one or more activities that are performed by the self-propelled device 104 when the self-propelled device 104 encounters the tile 108. In examples, tiles 108 include different patterns, colors, and/or characteristics, which, when detected by the self-propelled device 104, cause the self-propelled device 104 to perform the specific activity(s) indicated by the pattern, color, and/or other characteristics. More specifically, a tile 108, such as tile 108A, may include a color portion 110 and a border portion 112. Upon detecting a transition from the border portion 112 to the color portion 110, or from a color portion 110 to a different color portion 110, the self-propelled device 104 performs an activity consistent with the detected color portion 110. As an example, the color portion 110 may be associated with an activity to move in a substantially linear direction. Accordingly, the self-propelled device 104 moves in a substantially linear direction, as indicated by the path segment 114A.

Continuing with the above example, the self-propelled device 104 moves in a substantially linear direction as indicated by the path segment 114 and then encounters a tile 108B. The color portion 110 of the tile 108B may be associated with an activity to turn right ninety degrees and activity to move in a substantially linear direction after turning right ninety degrees. The self-propelled device 104 turns right ninety degrees and then moves in a substantially linear direction as indicated by the path segment 116. The self-propelled device then encounters a tile 108C. Like the color portion 110 of the tile 108B, the color portion 110 of the tile 108C may be associated with an activity to turn right ninety degrees and activity to move in a substantially linear direction after turning right ninety degrees. Accordingly, the self-propelled device 104 turns right ninety degrees and then moves in a substantially linear direction as indicated by the path segment 118. The self-propelled device then encounters a tile 108D. The color portion 110 of the tile 108D may be associated with an activity to turn left ninety degrees and an activity to move in a substantially linear direction after turning left ninety degrees. Accordingly, the self-propelled device 104 turns left ninety degrees and then moves in a substantially linear direction as indicated by the path segment 120. The self-propelled device 104 may encounter tiles 108E, 108F, and again 108C and perform the one or more activities indicated by tiles 108.

In accordance with examples of the present disclosure, the self-propelled device 104 may encounter the tile 108G. The tile 108G may include a color portion 110 associated with an activity that causes the self-propelled device to stop moving, an activity that causes lights of the self-propelled device 104 to operate in a predetermined pattern, and an activity that causes the self-propelled device 104 to play music. Accordingly, the self-propelled device 104, after detecting the color portion 110 of the tile 108G, stops moving, displays lights in a predetermined pattern, and plays music.

A tile 108 includes a color portion 110 as previously described. In some examples, a tile may include a plurality of color portions. For example, tile 122 includes a first color portion 124 and a second color portion 126. Accordingly, each of the first color portion 124 and second color portion 126 is associated with different activities. For example, the first color portion 124 is associated with an activity that causes the self-propelled device 104 to turn thirty degrees and move in a substantially linear direction. The second color portion 126 is associated with an activity that causes the self-propelled device to increase or decrease the speed or velocity at which it operates. In some examples, tile 122 may include a separation, or border, between the first color portion 124 and the second color portion 126. Although FIG. 1 depicts tiles including one color portion and two color portions, the tile may include more than two color portions. Although FIG. 1 depicts tiles including border portions, such as border portion 112, a tile may not have a border portion.

In accordance with examples of the present disclosure, the activities indicated by respective colors, patterns, and/or characteristics of the tiles may be static. Accordingly, the self-propelled device 104 performs the same activity when encountering the same tile. Alternatively, or in addition, one or more activities associated with the colors, patterns, and/or characteristics of the tile may be configurable.

Figure 2:
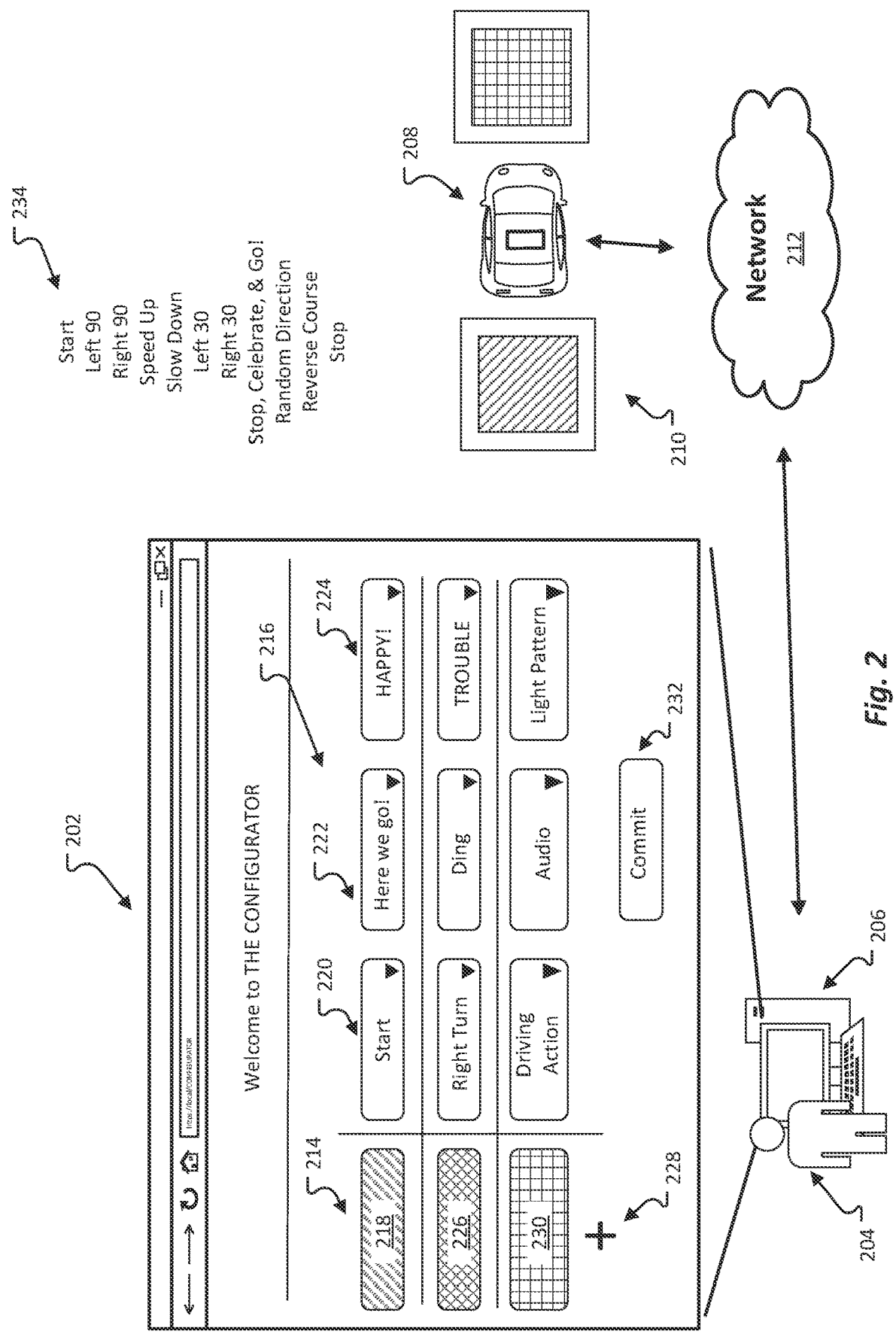
FIG. 2 depicts an example configuration user interface for configuring activities and colors in accordance with examples of the present disclosure.

FIG. 2 depicts an example configuration user interface 202 for configuring activities and colors in accordance with examples of the present disclosure. In examples, a user 204 navigates a web browser or other application to a configuration user interface 202 displayed to a display of the computing device 206. The configuration user interface 202 provides user 204 the option to configure the self-propelled device 208 and assign one or more activities to one or more colors, patterns, and/or characteristics of a tile, such as a tile 210. Alternatively, or in addition, the configuration user interface 202 provides user 204 the option to configure the self-propelled device 208 and assign one or more colors, patterns, and/or characteristics of a tile, such as a tile 210, to one or more activities. Accordingly, the user can select a color, pattern, or other characteristic 214. User 204 can then assign one or more activities 216 to the selected color, pattern, or other characteristic 214.

For example, a color 218 may be selected by the user 204. The user 204 can then select and assign an action 220, a music selection 222, and/or a light pattern 224. Similarly, the user may select a color 226 and assign a right turn, an audio sound associated with a "Ding" indicator, and a light pattern associated with a "Trouble" indicator. The user can select a control 228 of the configuration user interface 202 and add an additional color 230. The user can then assign activities to such color. A non-exhaustive list of example activities is provided as activities 234, where activities 234 may be directed to controlling the movement of the self-propelled device 208. Upon completing the color and activity configuration using the configuration user interface 202, the user can select the commit control 232 of the configuration user interface 202. The selection of the commit control 232 may cause the computing device 206 to save the color and activity configuration locally to the computing device 206 and/or transmit the color and activity configuration to the self-propelled device 208 via the network 212. In examples, the color and activity configuration may reside at the computing device 206 and/or at the self-propelled device 208; in examples, the color and activity configuration at the computing device 206 and the self-propelled device 208 may be synchronized such that the color and activity configuration is the same. The self-propelled device 208 may be the same as or similar to the self-propelled device 104 previously described. Tile 210 may be the same as or similar to the tile 108 previously described.

In accordance with at least some examples of the present disclosure, network 212 may comprise any type of known communication medium or collection of communication media and may use any type of protocols to transport messages between endpoints. Network 212 may include wired and/or wireless communication technologies. The Internet is an example of the network 212 that constitutes an Internet Protocol (IP) network consisting of many computers, computing networks, and other communication devices located all over the world, which are connected through many telephone systems and other means. Other examples of the network 212 include, without limitation, Bluetooth, Bluetooth low energy (BLE), standard Plain Old Telephone System (POTS), Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, and any other type of packet-switched or circuit-switched network known in the art. In addition, it can be appreciated that network 212 need not be limited to any one network type and instead may be comprised of a number of different networks and/or network types. Moreover, network 212 may comprise a number of different communication media such as coaxial cable, copper cable/wire, fiber-optic cable, antennas for transmitting/receiving wireless messages, and combinations thereof.

Figure 3:
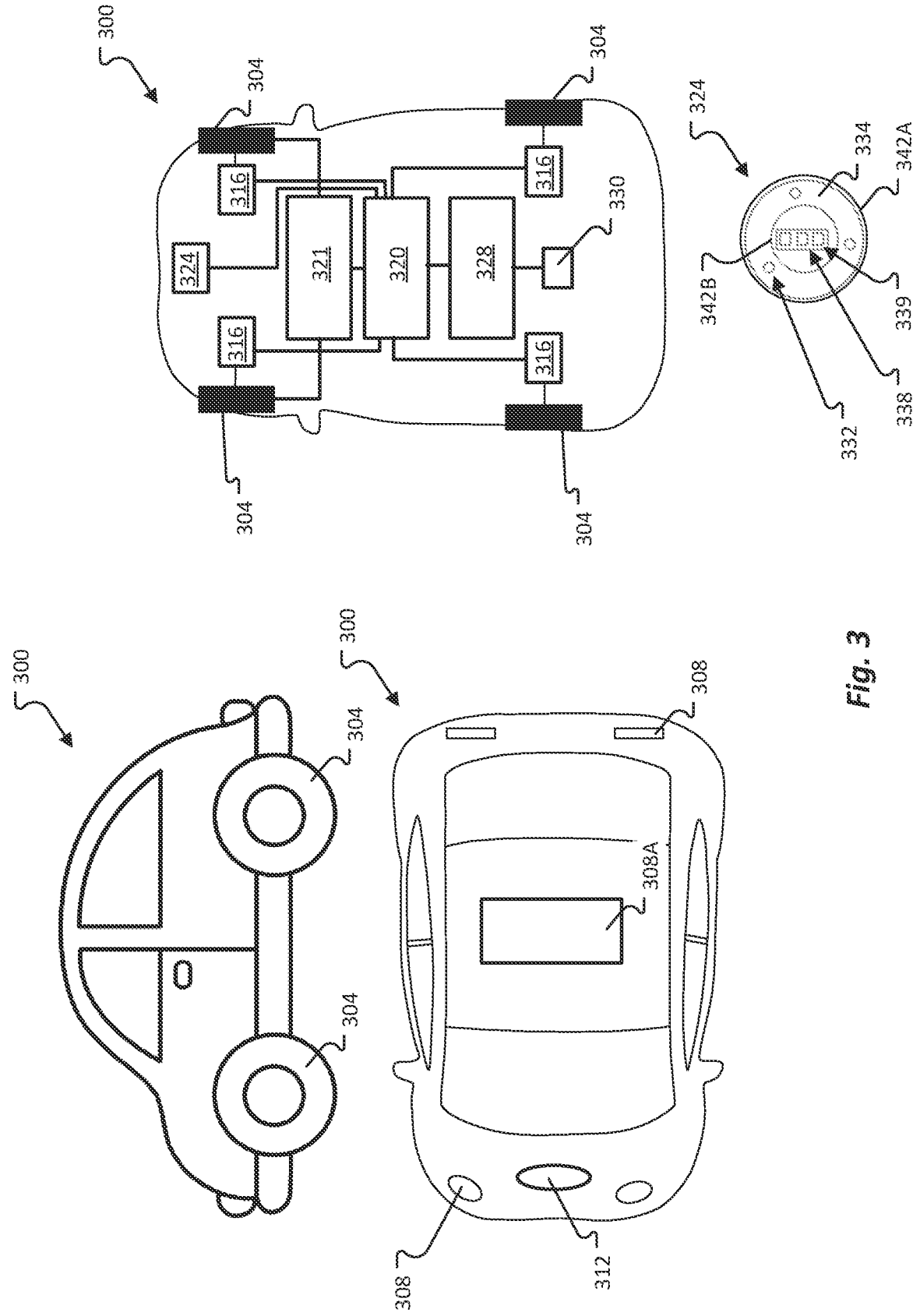
FIG. 3 depicts details of the self-propelled device in accordance with examples of the present disclosure.

FIG. 3 depicts details of the self-propelled device in accordance with examples of the present disclosure. The self-propelled device 300 can be configured with resources that enable one or more of the following: (i) maintain self-awareness of orientation and/or position relative to an initial reference frame after the device initiates movement; (ii) process control input programmatically, to enable a diverse range of program-specific responses to different control inputs; (iii) detect a transition between one or more colors and another color, such as when encountering a tile as previously described; and/or (iv) generate an output response, where the output response may be any kind of output including, but not limited to, initiating, changing, or stopping the self-propelled device's movement, the self-propelled device's lights, and/or the self-propelled device's audio.

FIG. 3 depicts three views of the self-propelled device 300; a side view, a top view, and a bottom view. The self-propelled device 300 includes wheels 304, lights 308, and an audio generator 312, such as a speaker. In examples, each wheel is coupled to an electric motor 316 that turns a corresponding wheel 304 in a direction specified by a control system 320. The control system 320 may receive input from an optical sensor 324; the received input includes detected surface color information. The detected surface color information corresponds to one or more detected colors and color intensity at a surface on which the self-propelled device 300 travels. For example, a detected surface color corresponding to hardwood may be provided to the control system 320 when the self-propelled device 300 travels on a surface consisting of hardwood. In examples, the detected surface color may correspond to a color portion 110 (FIG. 1) on a tile 108 (FIG. 1). Upon receiving the detected surface color information, the control system 320 processes the detected surface color information to determine whether a color transition has occurred. A color transition may occur when the optical sensor 324 provides detected surface color information indicative of a color that is different from a current color or non-color (e.g., other than a tile color). Alternatively, or in addition, a color transition may occur when the optical sensor 324 provides detected surface color information indicative of a color that is a color other than a color of a tile and then provides detected surface color information indicative of a color.

For example, as the self-propelled device 300 moves from a hardwood floor surface to a tile, such as a tile 108 (FIG. 1), the optical sensor 324 provides detected surface color information to the control system 320. The detected surface color information may correspond to a hardwood floor color, which is not a color of a tile. The self-propelled device 300 may move onto a tile; the optical sensor 324 may provide detected surface color information indicative of the border portion 112 (FIG. 1) and then provide detected surface color information indicative of the color portion 110 (FIG. 1).

Upon determining that a color transition has occurred, the control system 320 determines one or more activities based on the color and activity configuration. For example, a color transition to a blue color may indicate that the self-propelled device 300 is to turn thirty degrees to the right. As another example, a color transition to a red color may indicate that the self-propelled device is to stop and play a song. The control system 320 may match the detected color transition to a color in a look-up table to identify the activities that are to be performed. The look-up table may be stored in memory that is local to the self-propelled device 300. Based on the determined one or more activities, the control system 320 can cause one or more electric motors 316 to spin, moving the associated wheel 304 to move, may cause one or more lights 308 to light, and/or cause the audio generator 312 to output a sound. The self-propelled device 300 may be powered with an energy source 328 and may communicate with an external device, such as another self-propelled device 300 and/or a computing device 206 utilizing a transmitter 330.

The optical sensor 324 may include one or more light-emitting diodes 332. In some examples, the one or more light-emitting diodes 332 are positioned near one or more color detectors 338. For example, the one or more light-emitting diodes 332 are positioned in a ring 334 surrounding the one or more color detectors 338. The one or more light-emitting diodes 332 output one or more colors, or wavelengths, of light and direct such light to a surface on which the self-propelled device operates. In some examples, the one or more light-emitting diodes 332 may output a plurality of colors, such as but not limited to white light. The one or more color detectors 338 detect light, including a reflection of the light emitted from the one or more light-emitting diodes 332, from the surface on which the self-propelled device 300 operates and provide a signal representative of the detection to the control system 320 as surface color information. The one or more color detectors 338 can include a plurality of photoelectric converters 339 that generate an electric signal through the photoelectric conversion of incident light. The photoelectric converters 339 may detect a range of colors or wavelengths of light together with an intensity of the respective colors of light. For example, the photoelectric converters 339 may have a responsivity curve that focuses on or is specific to a particular range of wavelengths of light. Stated another way, a first color detector detects red light, a second color detector detects blue light, and a third color detector detects green light. In examples, one or more light-emitting diodes 332 are housed in ring 334 below a translucent covering 342A.

Similarly, the one or more color detectors 338 reside within the ring 334 below a translucent covering 342B. Examples of the translucent covering 342 include but are not limited to frosted glass or plastic and textured glass or plastic. The translucent covering 342A may be different from the translucent covering 342B.

In examples, the control system 320 provides one or more control signals to a steering system 321; the steering system 321 is coupled to one or more of the wheels 304 and may cause one or more of the wheels 304 to pivot such that the self-propelled device 300 changes a direction of travel. The control system 320 is responsible for causing the self-propelled device 300 to move in accordance with a detected color. Accordingly, the control system 320 may control the wheels 304, the steering system 321, and may communicate with another computing device using the transmitter 330. While the self-propelled device 300 is depicted as including four wheels, other configurations are contemplated. For example, the self-propelled device 300 may include three wheels (one in the front/two in the back, or one in the back and two in the front), less than four wheels, or more than four wheels. Alternatively, or in addition, the self-propelled device 300 may operate with a track, a sphere, or may use a cushion of air to hover.

Figure 4:
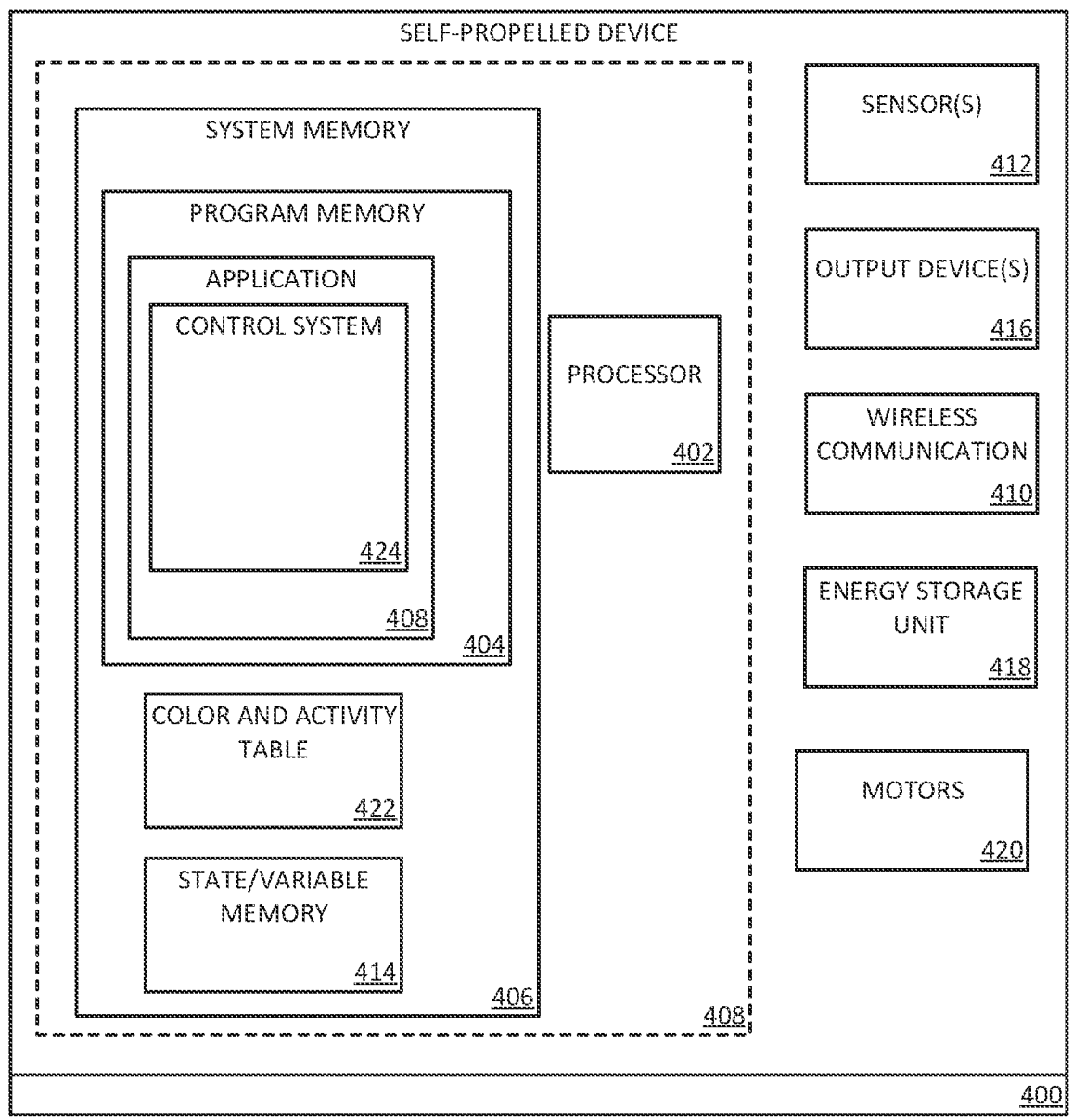
FIG. 4 depicts an example block diagram illustrating the components of a self-propelled device in accordance with examples of the present disclosure.

FIG. 4 is an example block diagram illustrating the components of a self-propelled device in accordance with examples of the present disclosure. The self-propelled device 400, which may be the same as or similar to the self-propelled device 300 (FIG. 3), can include several interconnected subsystems and modules. A processor 402 executes programmatic instructions from program memory 404 residing in a system memory 406. The instructions stored in the program memory 404 can be changed, for example, to add features, correct flaws, or modify behavior. In some examples, the program memory 404 stores programming instructions that are communicative or otherwise operable with software executing at a computing device, such as the computing device 206 (FIG. 2). The processor 402 can be configured to execute different applications 408 of programming instructions in order to alter the manner in which the self-propelled device 400 interprets or otherwise responds to detected surface color information.

A wireless communication module 410, in conjunction with a communication antenna, can serve to exchange data between processor 402 and other external devices. The data exchanges, for example, can provide communications, provide control, provide logical instructions, state information, and/or provide updates for the program memory 404. In some examples, the processor 402 can generate an output corresponding to state and/or position information that can then be communicated to a computing device via a wireless communication module 410. The mobility of the device makes wired connections undesirable. Therefore, the term "connection" can be understood to describe a logical link made without a physical attachment to the self-propelled device 400. Alternatively, or in addition, the term "connection" can be understood to describe a logical link made with or without a physical attachment to the self-propelled device 400.

In some examples, the wireless communication module 410 can implement a BLUETOOTH communications protocol, and the antenna is suitable for transmission and reception of BLUETOOTH signals. As an addition or alternative, the wireless communication module 410 can implement a Wi-Fi communications protocol, and the antenna is suitable for transmission and reception of Wi-Fi signals. In such examples, the self-propelled device 400 can be controlled and/or updated by a computing device via BLUETOOTH and/or Wi-Fi signals. Other wireless communication mediums and protocols can also be used in alternative implementations.

Sensor(s) 412 includes one or more color detectors 338 (FIG. 3) to detect a reflection of light from the surface on which the self-propelled device 400 operates. Sensor(s) 412 can provide the detected color surface information to the processor 402. In variations, the sensor(s) 412 may include other measurement devices, such as an accelerometer, gyroscope, and magnetometer. The sensor(s) 412 can provide input to enable the processor 402 to maintain awareness of the device's position relative to an initial reference frame after the device initiates movement. The sensor(s) 412 can include instruments for detecting light, temperature, humidity, or measuring chemical concentrations or radioactivity.

State/variable memory 414 can store information about the state of the device, including, for example, position, orientation, and distance traveled, a previously detected color, whether the detected color is stable, and/or whether the self-propelled device 400 is transitioning into or out of a detected color. The state/variable memory 414 can also store information corresponding to an initial reference frame of the self-propelled device 400 upon, for example, the device is put in use (e.g., the device is activated), as well as position and orientation information once the device is in use. In this manner, the self-propelled device 400 can utilize information of the state/variable memory 414 to maintain the position and orientation information of the self-propelled device 400 once the device is in operation. As another example, the state/variable memory 414 can track how many tiles the device has encountered during a device run. Such tile tracking information in the state/variable memory 414 can then be used to alter or change a specified activity associated with a color, pattern, or other characteristics. For example, the amount of time music is played from a speaker may increase as the number of tiles encountered increases. As another example, the brightness of the lights and/or the amount of time the lights are illuminated may increase as the number of tiles encountered increases.

In examples, a clock can provide timing information to the processor 402. For example, the clock can provide a time base for measuring intervals and rates of change. Furthermore, the clock can provide day, date, year, time, and alarm functions. Further still, the clock can allow the self-propelled device 400 to provide an alarm or alert at pre-set times. In addition, the clock may provide timing information to the processor 402 such that the processor prevents or otherwise stops the self-propelled device 400 from moving if a tile is not encountered within a certain amount of time.

The output device(s) 416 may include one or more LEDs emitting a human-visible primary color. The processor 402 can vary the relative intensity of each LED to produce a wide range of colors. Primary colors of light are those wherein a few colors can be blended in different amounts to produce a wide gamut of apparent colors. Many sets of primary colors of light are known, including for example red/green/blue, red/green/blue/white, and red/green/blue/amber. In examples, the output device(s) 416 may include the light-emitting diodes 332 (FIG. 3) previously described. In addition, the LEDs may refer to one or more lights 308 (FIG. 3) previously described. The output device(s) 416 may also refer to one or more speakers, or audio generators 312 (FIG. 3) previously described.

An energy storage unit 418 stores energy for operating the electronics and electromechanical components of the self-propelled device 400. For example, the energy storage unit 418 can be a rechargeable battery. An inductive charge port can allow for recharging the energy storage unit 418 without a wired electrical connection; however, it should be understood that the energy storage unit 418 can be charged, powered, etc. with a contact charger, wireless charger, and/or the energy storage unit 418 may be a replaceable battery. The motors 420 can convert electrical energy into mechanical energy to propel and steer the self-propelled device 400. The motors 420 may be the same as or similar to the electric motors 316 (FIG. 3) previously described. In examples, the self-propelled device may initiate a turn by varying the speed at which one or more motors 420 operate. In examples, when the motors 420 increase a rotational speed (e.g., revolutions per minute), the self-propelled device 400 may increase the speed at which it moves.

The color and activity table 422 stores activity assignment information for each color. As each of the detectable colors and associated activities can be configured by a user, the color and activity table 422 stores the updated configuration information. Accordingly, the control system 424 may access the color and activity table 422 to determine one or more activities to perform.

FIG. 5 depicts an example color and activity table in accordance with examples of the present disclosure. The color and activity table 500 may be a data structure, such as a database, flat file, spreadsheet, etc., that stores activity information assigned to one or more colors. In examples, each color may be associated with a color_id 502. One or more of a drive function activity 504, audio function activity 506, and light function activity 508 may be associated or otherwise assigned to a color_id 502. Of course, other types of activities (e.g., 510) may be associated with or otherwise assigned to a color_id 502. As an example of the assigned activity information, a ninety-degree right turn may be assigned to a color_id associated with a green color. As another example, a thirty-degree right turn may be associated with a color_id associated with a red color. Similarly, audio functions, or tunes and light functions, or patterns, may be assigned to color_ids associated with a color. As previously described, the color and activity table 500 is stored in the color and activity table 422.

Figure 6:
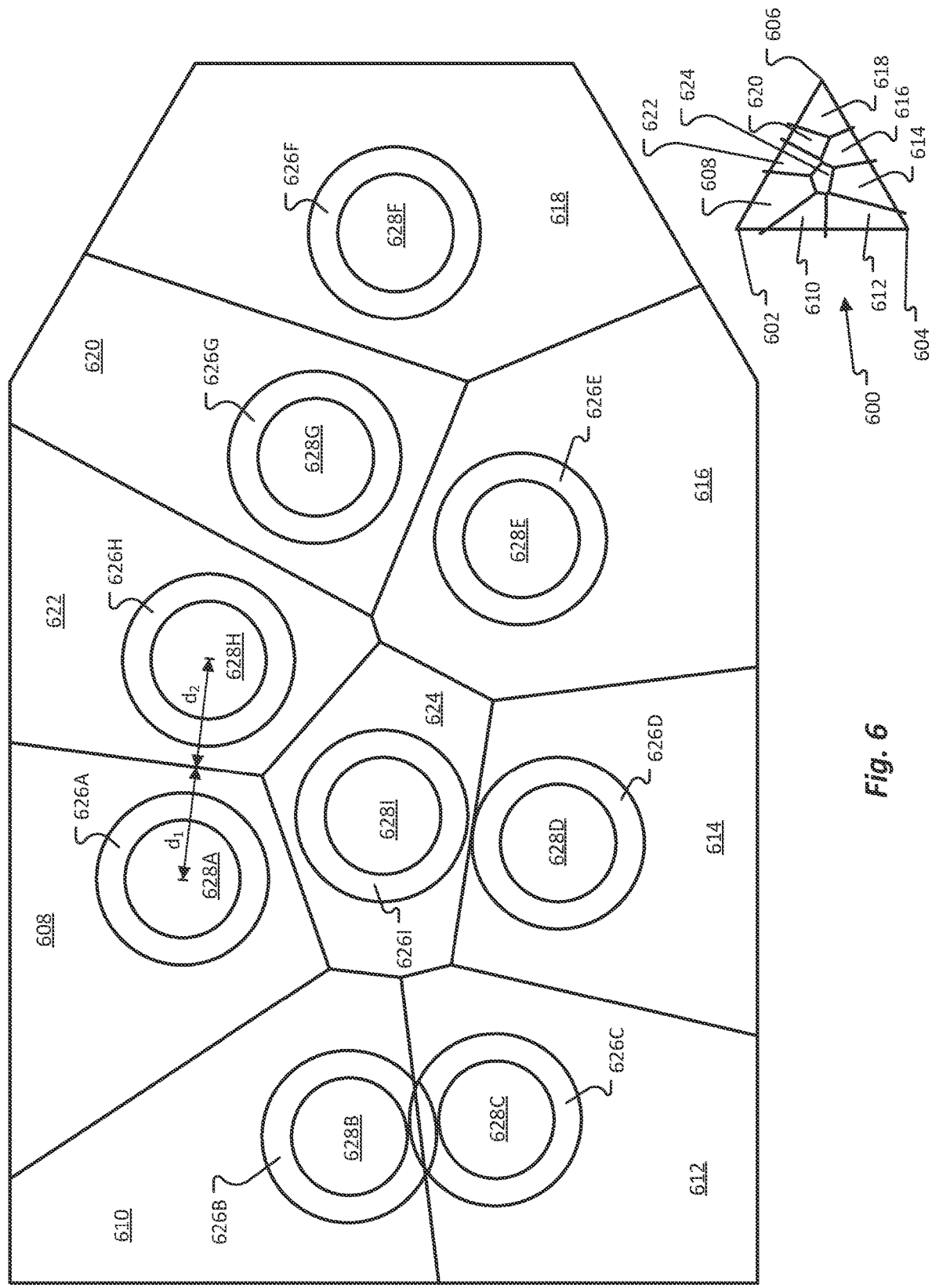
FIG. 6 depicts a color space that is divided into a plurality of regions corresponding to color portions of tiles in accordance with examples of the present disclosure.

As previously described, the one or more color detectors 338 may detect surface colors of surfaces over which the self-propelled device operates. As illustrated in FIG. 6, the color space 600 that is detectable by the one or more color detectors 338 is divided into a plurality of regions 608-622 corresponding to color portions of the tiles, such as tile 108 (FIG. 1). The color space 600, depicted as a color triangle with a green vertex 602, a blue vertex 604, and a red vertex 606, is divided into a plurality of regions 608, 610, 612, 614, 616, 618, 620, and 622 corresponding to the color portions of tiles. In examples, the regions 608-622 may include but are not limited to a light-green region 608, a green region 610, a blue region 612, a purple region 614, a pink region 616, a red region 618, an orange region 620, and a yellow region 622. In addition, a white region 624 is also included in the color space. Within each region, an area defined by some shape, such as a circle area 628, may correspond to the specific chromaticity hue and chromaticity saturation values of a color portion of a tile. That is, while the color portion of the tile may have color values (e.g., chromaticity, saturation, and brightness) equal to the center of the circle area 628, color values within the circle may be associated with the same tile color portion. Accordingly, slight variations in detected surface color information can be tolerated.

In addition, a hysteresis band 626 surrounds circle area 628 and accounts for detected surface color stability issues that may arise during operation. For example, an optical sensor 324 (FIG. 3) may get dirty, bounce, be noisy, or encounter another obstacle, which may alter and/or vary detected surface color information during operation of the self-propelled device 300 (FIG. 3). To prevent color transitions from occurring due to noise or other variations when the detected surface color information varies from being within the circle area 628 and out of the circle area 628, the hysteresis band 626 is utilized. The hysteresis band 626 is configured to require that the detected surface color information corresponds to a location within the circle area 628 when a transition to a color tile occurs (e.g., transitioning from a non-color to a color) and require that the detected surface color information corresponds to a location outside of the hysteresis band 626 when transitioning out of the color tile (e.g., transitioning from a color to a non-color). Accordingly, noise and other variations in the detected surface color information can be accounted for when transitioning from a color other than a color portion on a tile to a color portion on a tile. In examples, a distance between a center of a circle area 628 and a boundary of the region may be equal to a distance between an adjacent circle's center and the same boundary. That is, the distance $d_1$ may be equal to distance $d_2$. Although the different circle areas 628 are shown as circles, other shapes are also contemplated. For example, a polygon encompassing a portion of the region may operate in a similar manner as a circle.

Figure 7:
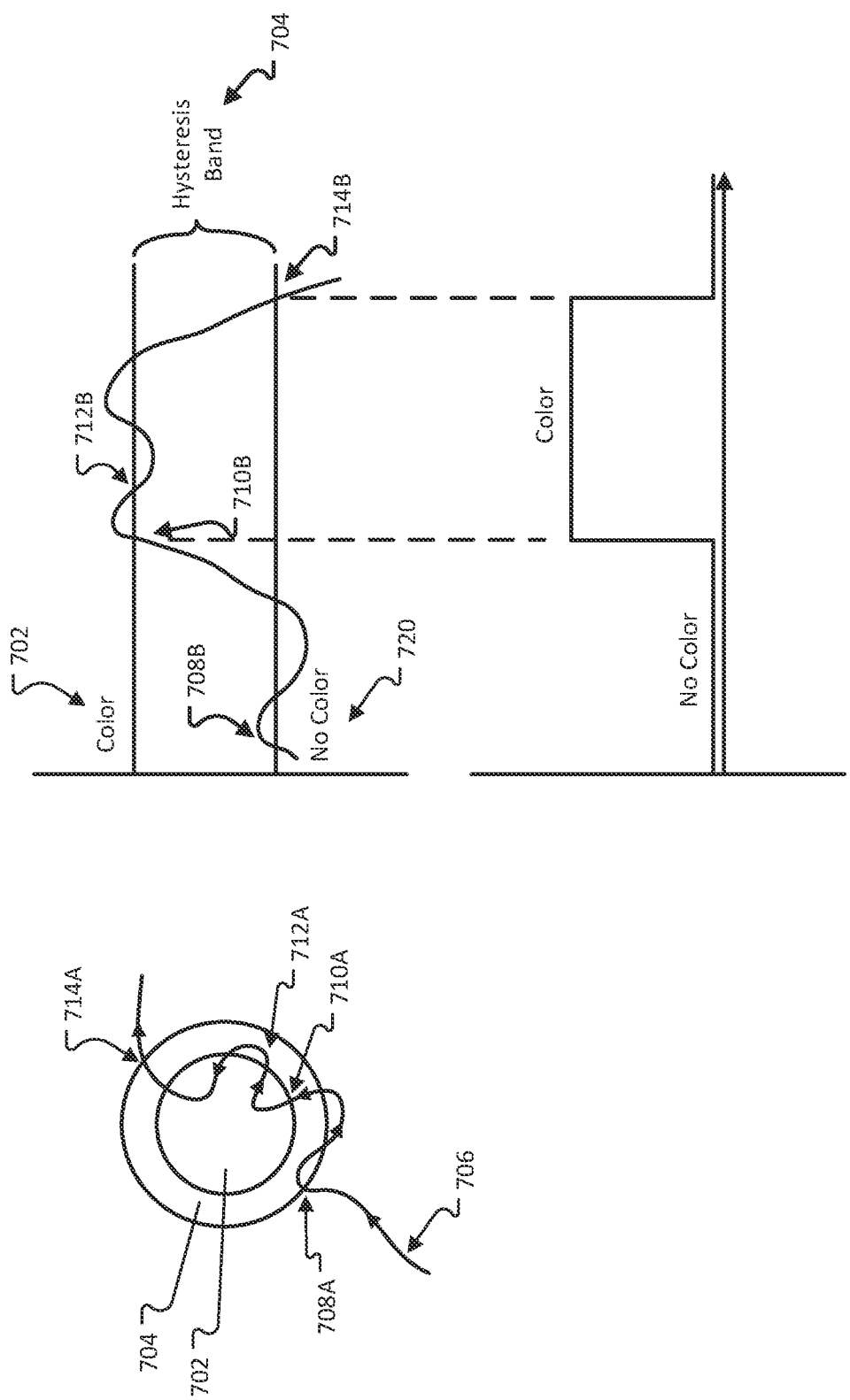
FIG. 7 depicts additional details of a hysteresis band in accordance with examples of the present disclosure.

FIG. 7 describes additional details of a hysteresis band in accordance with examples of the present disclosure. More specifically, an area 702 having a hysteresis band 704 is depicted in FIG. 7. The area 702 can correspond to any of the previously mentioned areas 608-624 in FIG. 6. A path corresponding to color readings of a self-propelled device is depicted as 706, where the path 706 depicts a location of detected colors as the self-propelled device moves into and out of an area 702 through the hysteresis band 704. In examples, all of the variations in color readings may not be associated with the self-propelled device moving. Rather, some color variations may be attributed to noise or other variations in color measurement. When the optical sensor of the self-propelled device detects a color in the hysteresis band 704, the control system determines that a color transition has not occurred. Accordingly, at 708A, the self-propelled device indicates that a color change or transition has not occurred. As the self-propelled device detects a color within area 702, such as at 710A, the control system of the self-propelled device indicates a color transition from a non-color to a color indicated by area 702 has occurred. In some examples, the self-propelled device may determine an activity to perform. At 712A, the self-propelled device may indicate a color reading in the hysteresis band; because the color reading is in the hysteresis band, a transition to a color other than the color represented by the area 702 does not occur. Instead, the color determination may remain the same. At 714A, the self-propelled device may detect a color outside of the hysteresis band 704; accordingly, the control system of the self-propelled device indicates that a color transition out of a color has occurred (e.g., from the color represented by area 702 to a non-color).

FIG. 7 also depicts a representation of the hysteresis band 704 in graph form. When the optical sensor of the self-propelled device detects a color in the hysteresis band 704, the control system determines that a color transition has not occurred. Accordingly, at 708B, the self-propelled device would indicate that a color change or transition has not occurred. As the self-propelled device detects a color within area 702, such as at 710B, the self-propelled device's control system determines a color transition from a non-color (e.g., 720) to a color indicated by area 702 has occurred. In some examples, the self-propelled device may determine an activity to perform. At 712B, the self-propelled device may indicate a color reading in the hysteresis band; because the color reading is in the hysteresis band, a transition to a color other than the color represented by the area 702 does not occur. Instead, the color determination may remain the same. At 714B, the self-propelled device may detect a color outside of the hysteresis band 704; accordingly, the self-propelled device's control system determines that a color transition out of a color has occurred (e.g., from the color represented by area 702 to a non-color). Although not depicted in FIG. 7, a measure of brightness may be subject to hysteresis. That is, some brightness variations may be attributed to noise or other variations in the brightness measurement. Thus, when the optical sensor of the self-propelled device detects a brightness that is in a hysteresis band, the control system determines that a color transition has not occurred.

Figure 8:
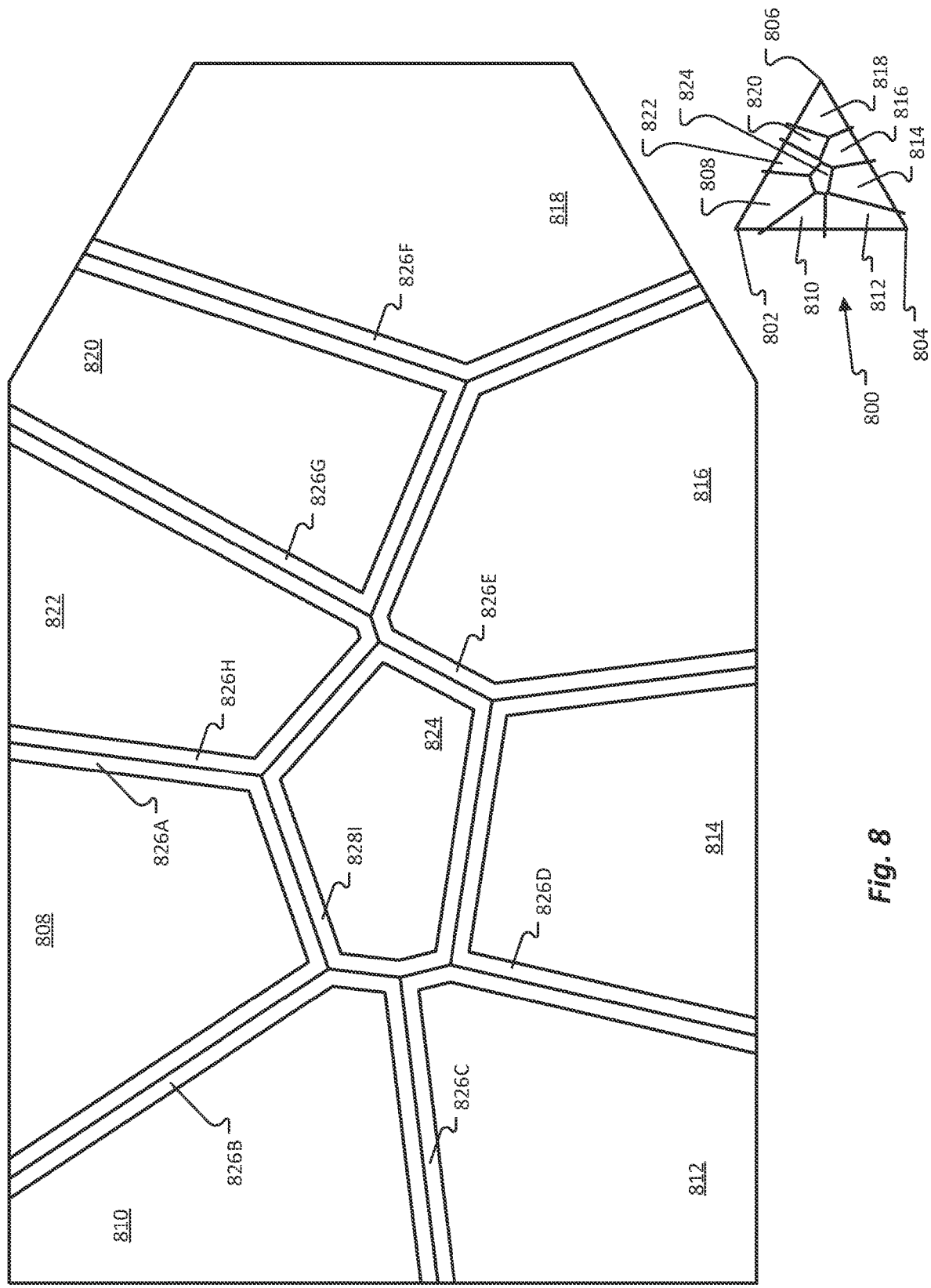
FIG. 8 depicts a color space that is divided into a plurality of regions corresponding to color portions of tiles in accordance with examples of the present disclosure.

FIG. 8 depicts a color space 800 that is divided into a plurality of regions 808-822 corresponding to color portions of the tiles, such as tile 108 (FIG. 1). The color space 800, depicted as a color triangle with a green vertex 802, a blue vertex 804, and a red vertex 806, is divided into a plurality of regions 808, 810, 812, 814, 816, 818, 820, and 822 corresponding to the color portions of tiles. In examples, the regions 808-822 may include but are not limited to a light-green region 808, a green region 810, a blue region 812, a purple region 814, a pink region 816, a red region 818, an orange region 820, and a yellow region 822. In addition, a white region 824 is also included in the color space. A hysteresis band 828 forms a border between other hysteresis bands 826 and other regions 808-822. To prevent color transitions from occurring due to noise or other slight variations when the detected surface color information fluctuates, the hysteresis band 828 is utilized. The hysteresis band 828 is configured to require that the detected surface color information correspond to a location within the regions 808-824 when a transition to a color tile occurs (e.g., transitioning from a non-color to a color) and require that the detected surface color information correspond to a location outside of the hysteresis band 828 when transitioning out of the color tile (e.g., transitioning from a color to a non-color). Accordingly, noise and other variations in the detected surface color information can be accounted for when transitioning from a color other than a color portion on a tile to a color portion on a tile.

Figure 9:
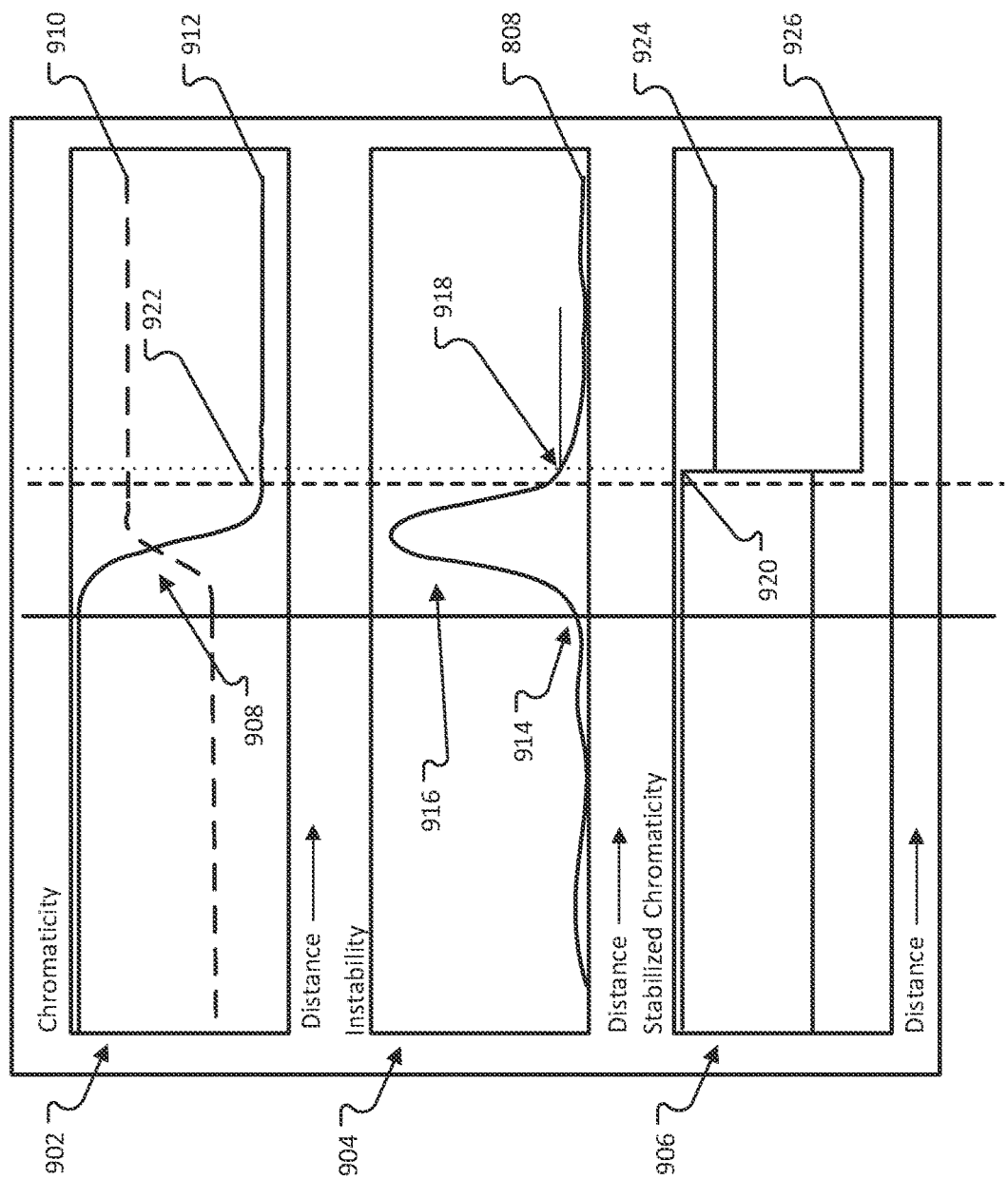
FIG. 9 depicts a graph of color instability during a transition from one color to another color in accordance with the examples of the present disclosure.

FIG. 9 depicts a graph of color instability during a transition from one color to another color in accordance with the examples of the present disclosure. In addition to utilizing a hysteresis band around areas to reduce the effects of color reading variations, a measure of color instability over a given distance may be used to ensure the self-propelled device is operating on or otherwise has encountered a color portion of a tile and subsequently determine that a color transition has occurred. In addition, a measure of color instability may be used to avoid misinterpreting a color reading. For example, a measure of color instability may be used to avoid momentary misinterpretations of color caused by color combinations that occur during a transition from one color to another (e.g., transition from red to yellow may include a momentary color reading of orange). A top graph 902 depicts an x, y measure of chromaticity overtime. A transition from one color to another color may be represented at 908. That is, a transition from one color to another color can be viewed utilizing the x-value 910 and the y-value 912 over a given distance. Over a distance, the x-value 910 and the y-value 912 change from a first color to a second color.

A measure of instability may be based on a size of a color space occupied by data points over a given physical distance. In examples, the color space may be a shape, such as a circle that contains color measurements. In some examples, a measure of the color space may be a diameter, radius, area, or other measurement associated with a circle. When the measure of instability is sufficiently small, following and relative to a large measure of instability, a determination can be made that a color transition has occurred. The middle graph 904 depicts an example of instability over distance. At 914, a measure of instability increases as expected due to a color change. The measure of instability may peak around 916 and drop. Accordingly, when the measure of instability drops below a value 918, the control system may determine that a color change has occurred. Alternatively, or in addition, when the measure of instability is below a value 918 for a predetermined distance, the control system may determine that a color change has occurred. Such predetermined distance may be equal to the size, (e.g., width) of the optical sensor 324. Thus, at a distance at 920 on the graph 906, the control system determines that a color change has occurred and determines that the new color is comprised of chromaticity x-value 926 and y-value 924. In accordance with examples of the present disclosure, even though a color reading leaves a hysteresis ring, for example, at 922, a decision that a color change has occurred is not made until after the chromaticity is stable (e.g., at 920). In examples, each of the chromaticity measurement, instability measurement, and brightness measurement are subject to hysteresis. Similarly, even though a brightness reading leaves a hysteresis band, a decision that a color change has occurred is not made until after the chromaticity is stable. That is, some chromaticity variations, brightness variations, and instability variations may be attributed to noise or other variations in the measurement. Thus, when the optical sensor of the self-propelled device detects a brightness and chromaticity, and instability of the measurement is obtained, for a color transition to occur, each of the chromaticity, brightness, and instability should be outside of a hysteresis band for a color transition to occur.

Figure 10:
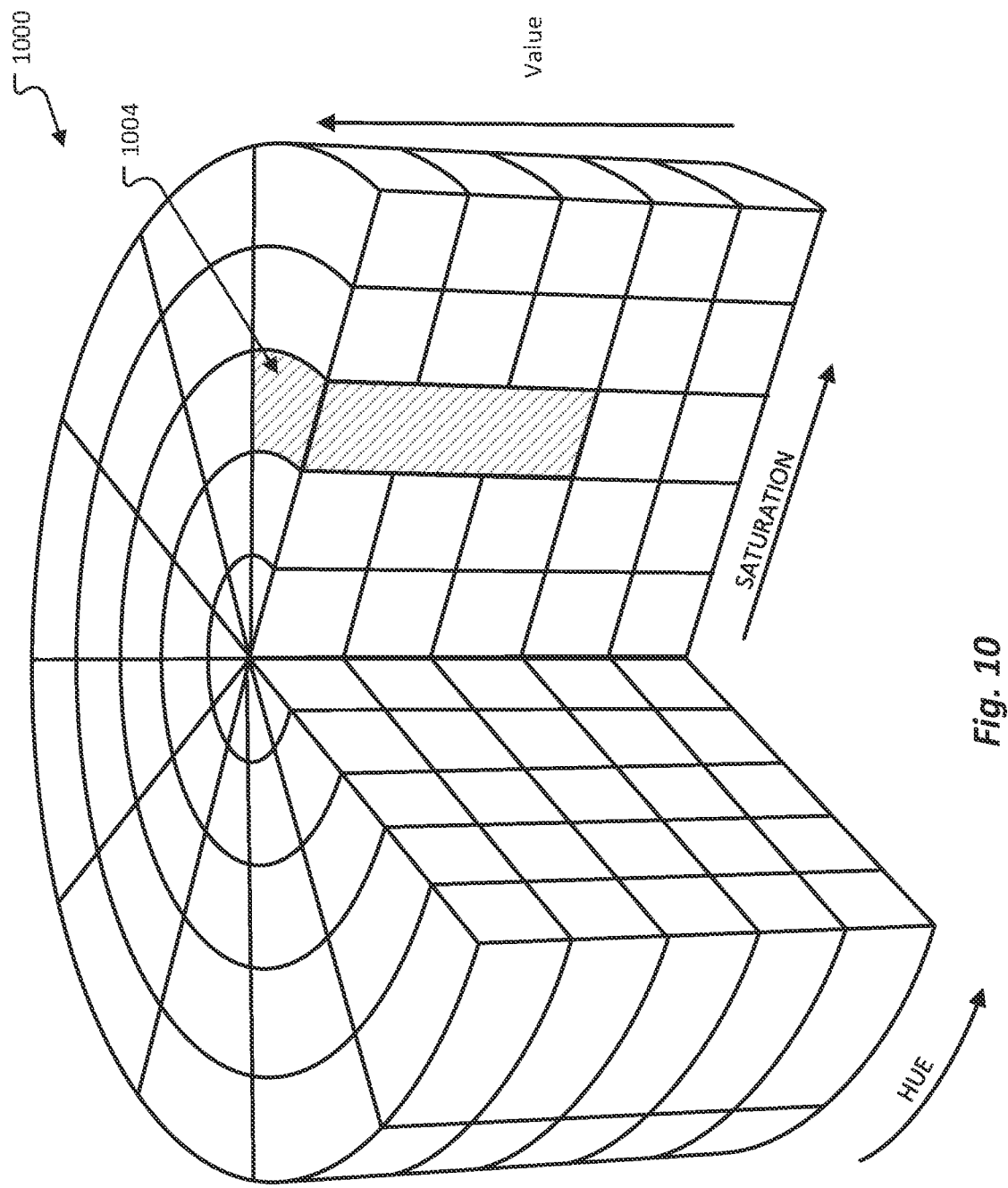
FIG. 10 depicts an example color space in accordance with examples of the present disclosure.

FIG. 10 depicts an example color space 1000 in accordance with examples of the present disclosure. The color space depicted in FIG. 10 corresponds to an HSV color space. A color can be defined in terms of a hue measurement, a saturation measurement, and a value measurement. In examples, to match a color portion of a tile, the color reading from the optical detector (e.g., 324 FIG. 3) must match the hue, saturation, and value numbers for an area in a color region corresponding to a color portion on a tile. Similarly, in a chromaticity space, to transition to a color depicted on a tile, the color reading from the optical detector (e.g., 324 FIG. 3) must match the chromaticity values and brightness values for an area in a color region corresponding to a color portion on the tile. Accordingly, even though a hue and saturation value match a hue and saturation value for an area within a region corresponding to a color portion of a tile, the value, or brightness value must match as well. For example, a color corresponding to a color portion in a tile may include the hatched area 1004. If the saturation and hue values for a detected color are within the hatched area 1004, and the brightness or value is within the hatched area 1004, then the detected color may match the color corresponding to the color portion on the tile. However, if one or more of the hue, saturation, or value do not fall within the hatched area 1004, the color readings will not be considered to match the color corresponding to the color portion on the tile.

Figure 11:
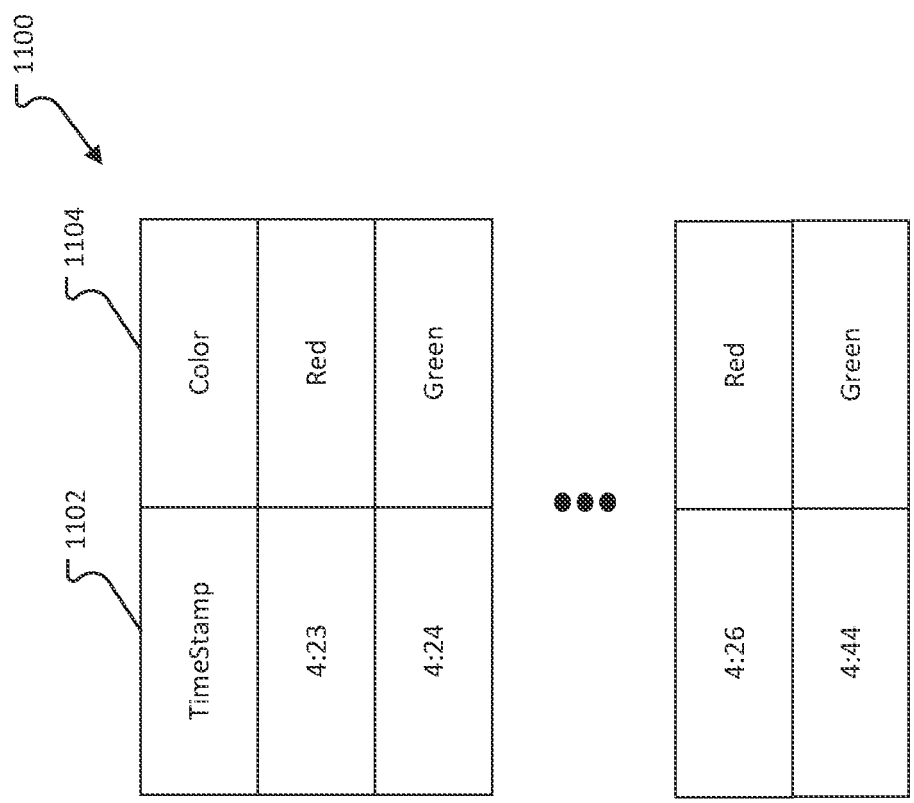
FIG. 11 depicts a data structure for tracking color transitions in accordance with examples of the present disclosure.

FIG. 11 depicts a data structure for tracking color transitions in accordance with examples of the present disclosure. In examples, the data structure 1100 may include a timestamp 1102 and a color 1104. Each time a color transition occurs, and/or each instance in which a color portion of a tile is encountered, a timestamp together with the color may be added to the data structure 1100. Accordingly, in instances where an activity depends on previous activities and/or previously encountered tiles (e.g., a second green tile, a third red tile), the data structure 1100 may be accessed. In some examples, the data structure 1100 may be accessed to determine how many tiles were encountered and/or a total distance traveled as part of a game competition and/or to alter an activity, such as the lights and/or audio output by the self-propelled device.

Figure 12:
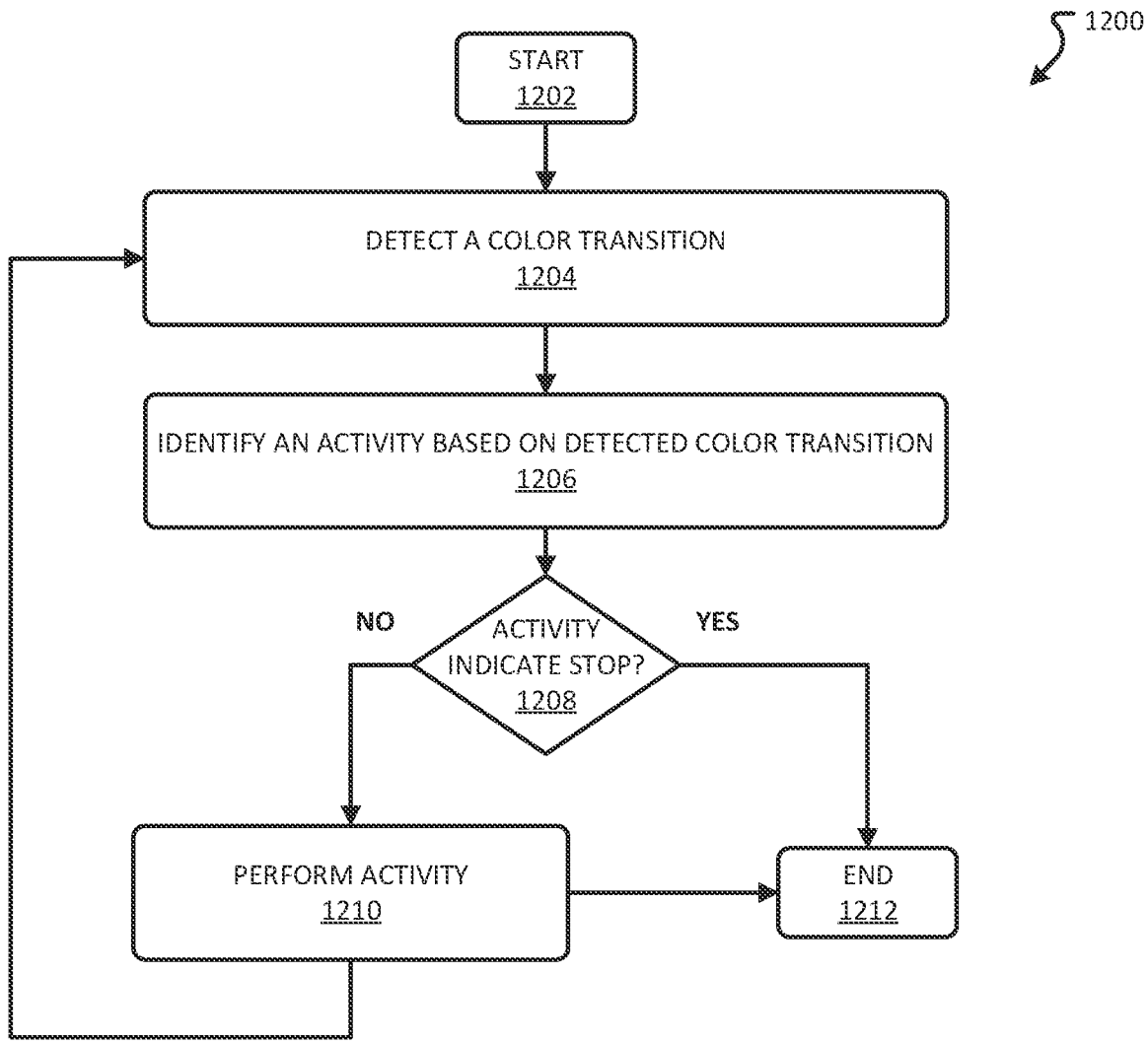
FIG. 12 depicts details of a method for operating a self-propelled device in accordance with examples of the present disclosure.

FIG. 12 depicts details of a method 1200 for operating a self-propelled device in accordance with examples of the present disclosure. A general order for the steps of the method 1200 is shown in FIG. 12. Generally, the method 1200 starts at 1202 and ends at 1212. The method 1200 may include more or fewer steps or may arrange the order of the steps differently than those shown in FIG. 12. The method 1200 can be executed as a set of processor-executable instructions executed by a processor and encoded or stored on a computer-readable medium. In examples, aspects of the method 1200 are performed by the self-propelled device. Further, the method 1200 can be performed by gates or circuits associated with a processor, Application Specific Integrated Circuit (ASIC), a field-programmable gate array (FPGA), a system on chip (SOC), a neural processing unit, or other hardware device. Hereinafter, the method 1200 shall be explained with reference to the systems, components, modules, software, data structures, user interfaces, etc., described in conjunction with FIGS. 1-11.

The method starts at 1202, where the self-propelled device may be turned on, or a start action may be initiated at the self-propelled device. In examples, a user may activate a switch thereby turning the self-propelled device on. The method 1200 may proceed to 1204. At 1204, the optical detector may detect a color transition. For example, the control system 320 (FIG. 3) may receive input from the optical sensor 324 (FIG. 3); the received input includes detected surface color information. In examples, the detected surface color may correspond to a color portion 110 (FIG. 1) on a tile 108 (FIG. 1). Upon receiving the detected surface color information, the control system 320 (FIG. 3) processes the detected surface color information to determine whether a color transition has occurred. A color transition can occur when the optical sensor 324 (FIG. 3) provides detected surface color information indicative of a color that is a color other than a color portion of a tile and then provides the detected surface color information indicative of a color portion. For example, an optical sensor may detect a white color and then detect a green color. As another example, the optical sensor may detect an orange color, then a white color, and then a red color. Once a color transition is detected at 1204, the method may proceed to 1206, where an activity may be identified based on the detected color transition.

For example, a control system, such as the control system 320 may match the detected color transition to a color in a look-up table to identify the activities that are to be performed, where the look-up table may be stored in memory. For example, based on the detected color transition, one or more activities may be identified such as but not limited to causing one or more electric motors to move the self-propelled device, causing one or more lights to light, and/or causing an audio generator to output a sound. In some examples, the identified activity may be a stop activity. A stop activity can be the last activity in a sequence of activities and may be associated with a specific color portion of a tile.

If at 1208, the identified activity is not a stop activity, the method may proceed to 1200, where the identified activity may be performed. For example, the self-propelled device may cause an electric motor to move the self-propelled device, cause one or more lights to light, and/or cause an audio generator to output a sound. In some examples, the method 1200 may proceed back to 1204 where a color transition may be detected. In examples where the stop activity causes the self-propelled device to output a sound, move, dance, etc., the method 1200 may perform the activity at 1210 and then proceed to 1212 where the method ends. In some examples, if a color transition and/or a color is not detected within a certain period of time or within a certain distance traveled, the self-propelled device may stop at 1208. Thus, in addition to identifying an activity based on a detected color transition at 1206, an activity may be identified (e.g., a stop activity) if a color transition and/or a color is not detected within a specified period of time (including, but not limited to, one-half seconds, one second, two seconds, etc.) or within a specified distance traveled (including, but not limited to, six meters, ten meters, fifteen meters, etc.). Alternatively, the method may end at 1212 upon determining that the activity is a stop activity.

Figure 13:
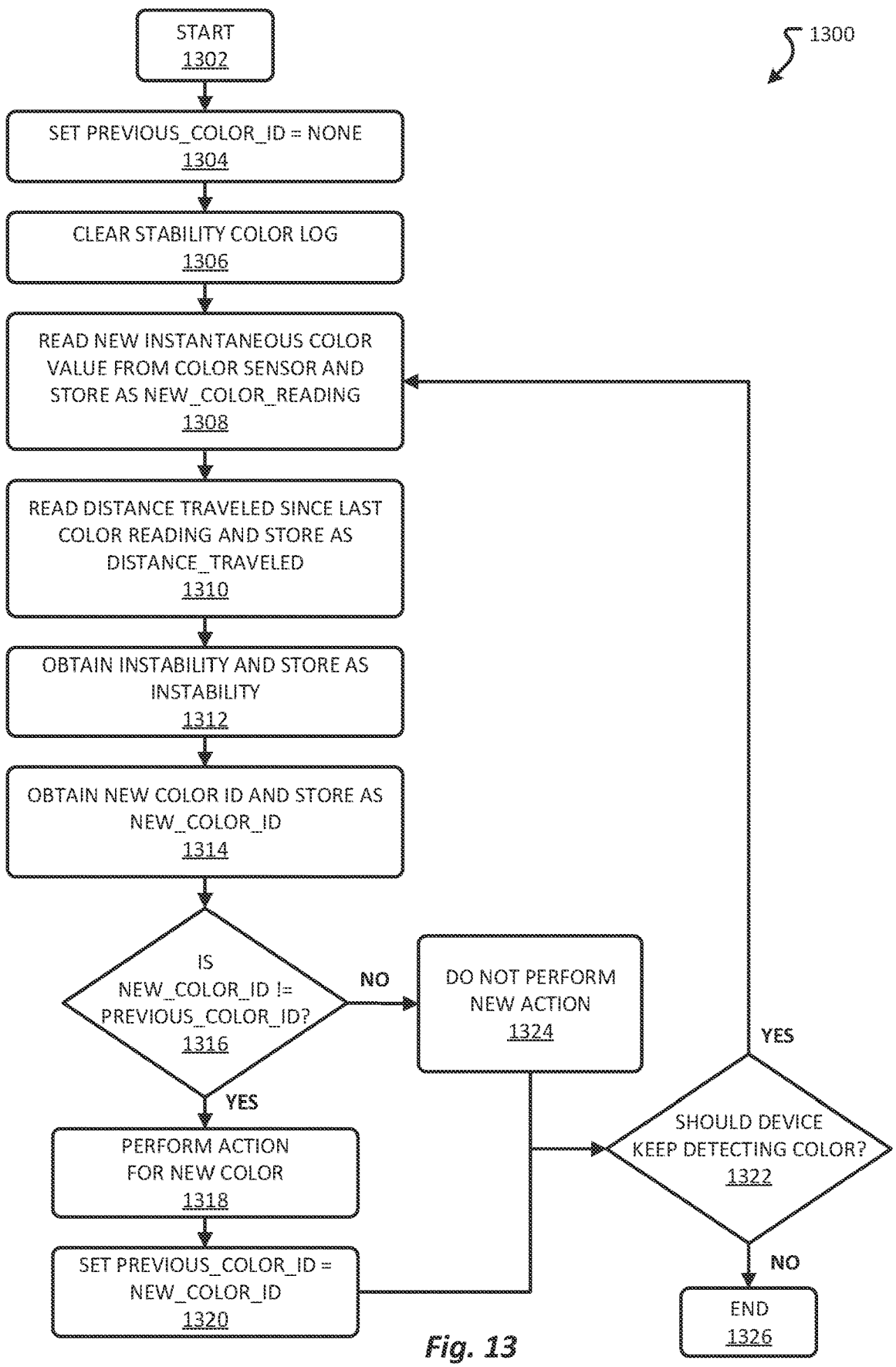
FIG. 13 depicts details of a method for detecting a color transition and determining the color transitioned to in accordance with examples of the present disclosure.

FIG. 13 depicts details of a method 1300 for detecting a color transition and performing an action based on the detected color transition in accordance with examples of the present disclosure. A general order for the steps of the method 1300 is shown in FIG. 13. Generally, the method 1300 starts at 1302 and ends at 1326. The method 1300 may include more or fewer steps or may arrange the order of the steps differently than those shown in FIG. 13. The method 1300 can be executed as a set of processor-executable instructions executed by a processor and encoded or stored on a computer-readable medium. In examples, aspects of the method 1300 are performed by the self-propelled device. Further, the method 1300 can be performed by gates or circuits associated with a processor, Application Specific Integrated Circuit (ASIC), a field programmable gate array (FPGA), a system on chip (SOC), a neural processing unit, or other hardware device. Hereinafter, the method 1300 shall be explained with reference to the systems, components, modules, software, data structures, user interfaces, etc. described in conjunction with FIGS. 1-12.

The method starts at 1302 and proceeds to 1304, where a control system may set a value of a previous_color_id variable that indicates a previous color identification to "None" as part of an initialization process. Of course, the value of the previous_color_id variable may be set to an initialization value indicating that the previous color identification is not currently associated with an actual color or an actual color in a target color's definite match region. The variable may reside in the state/variable memory 414. The method 1300 may proceed to 1306 where a control system may clear the stability color log as part of the initialization process. The stability color log may reside in the state/variable memory 414. The method 1300 may then proceed to 1308, where a control system causes a new instantaneous color value to be acquired from an optical sensor, such as the optical sensor 324. The value of a new_color_reading variable may then be set to the new instantaneous color value acquired form the optical sensor. In examples, the new instantaneous color value may be obtained from the optical sensor and may include, or be converted to include, chromaticity information (including, but not limited to hue, saturation, or similar measurement) and brightness information (including, but not limited to a brightness value, lightness, luminance, or similar measurement). Accordingly, the value of the new_color_reading may include or otherwise be associated with a chromaticity measurement and a brightness measurement.

The method may then proceed to 1310, where a control system may obtain distance information indicating a distance that the self-propelled device has traveled since the last color reading; the control system may then set a value of a distance_traveled variable to the obtained distance information. In examples, the value of the distance_traveled variable may be associated with a physical distance and/or a time value. The method 1300 may proceed to 1312, where the control system may generate a color instability measurement value based on the value of the new_color_reading variable and the value of the distance_traveled variable; the control system may then set an instability variable to such generated value. Color instability may be calculated over a given distance (e.g., the instability over the last two centimeters of travel distance). Additional details directed to the generation of the instability value can be found in FIG. 14 and the description associated therewith. The method 1300 may proceed to 1314, where a control system may obtain a new color identification value based on the value of the new_color_reading variable, the value of the previous_color_id variable, and the value of the instability variable. The new color identification value is a value for a stabilized color (e.g., matching either a target color identification or "None"). For example, the new color identification value may be "red", "green", "blue", none. The value of the new_color_id variable may then be set to the obtained new color identification. Additional details directed to the generation of the new color identification value can be found in FIG. 15 and the description associated therewith.

At 1316, the method 1300 determines if the value of the new_color_id variable is not equal to the value of the previous_color_id. That is, the evaluation at 1316 is equivalent to asking "were the two colors (e.g., color identified by the new_color_id variable and the color identified by the previous_color_id) identified as different colors," where a value of "None" counts as a color. For example, any stabilized color identified as "red" would be considered to be different from (or not equal to) any stabilized color identified as another target color (e.g., blue, green, etc.) and any stabilized color identified as "None." That is, any stabilized color identified as "red" would be considered to be the same as any other stabilized color identified as "red." If the value of the new_color_id variable is different from the value of the previous_color_id variable, then a color transition has occurred and the method 1300 proceeds to 1318 where an action associated with the new color or action associated with the transition to the new color may be performed. For example, a control system may reference the color and activity table 422 to determine one or more activities to perform as described above.

The method may proceed to 1320, where the value of the previous_color_id variable is set to the value of the new_color_id variable. The method 1300 may then proceed to 1322 where the control system may determine whether the self-propelled device should keep detecting color. For example, if the action performed for the new color at 1316 is a stop activity or otherwise results in a stop activity, the control system may determine that the self-propelled device should not keep detecting color and the method may proceed to 1326 and end. A stop activity can be the last activity in a sequence of activities and may be associated with a specific color as identified from the value of the new_color_id variable. Alternatively, the method 1300 may proceed back to 1308 where a control system causes a new instantaneous color value to be acquired from an optical sensor, such as the optical sensor 324.

Alternatively, if at 1316, the value of the new_color_id variable is equal to the value of the previous_color_id variable, then the method may proceed to 1324 where no new action is performed. Thus, the method may proceed to 1322 where the control system may determine whether the self-propelled device should keep detecting color. In some example, the control system may determine that a color transition has not occurred within a certain period of time or within a specified distance traveled and cause the self-propelled device to stop detecting color at 1322. That is, if a color transition and/or a color is not detected within a specified period of time (including, but not limited to, one-half seconds, one second, two seconds, etc.) or within a specified distance traveled (including, but not limited to, six meters, ten meters, fifteen meters, etc.), the control system may determine that the self-propelled device should not keep detecting color and proceed to 1326 where method 1300 ends.

Figure 14:
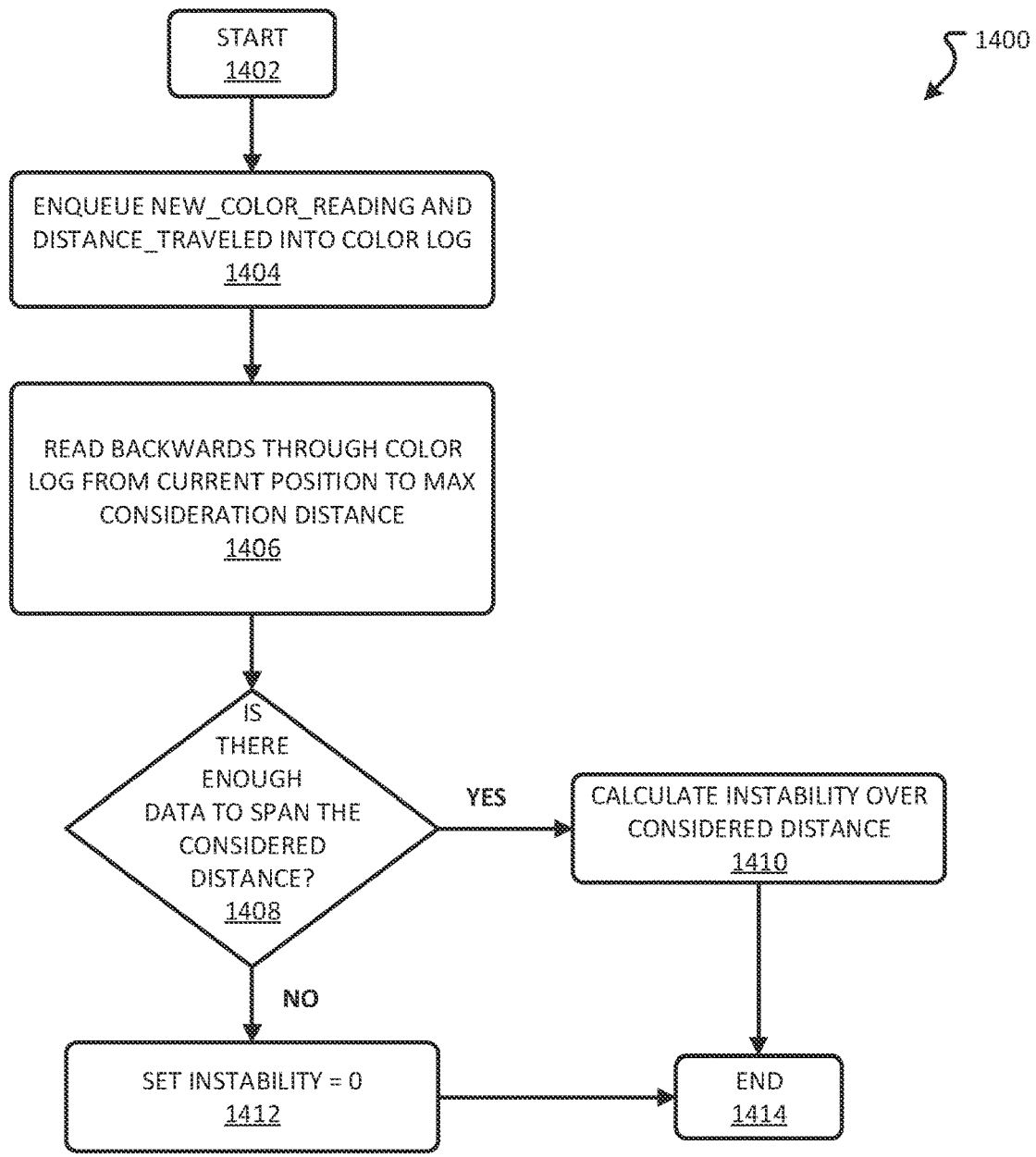
FIG. 14 depicts details of a method for updating an instability measurement in accordance with examples of the present disclosure.

FIG. 14 depicts details of a method 1400 for updating an instability measurement in accordance with examples of the present disclosure. In examples, the method 1400 may log color readings and distances traveled, and generate a color instability measurement, or value, over a given distance. For example, the method 1400 may generate a color instability measurement value over the last two centimeters of travel distance. A general order for the steps of the method 1400 is shown in FIG. 14. Generally, the method 1400 starts at 1402 and ends at 1414. The method 1400 may include more or fewer steps or may arrange the order of the steps differently than those shown in FIG. 14. The method 1400 can be executed as a set of processor-executable instructions executed by a processor and encoded or stored on a computer-readable medium. In examples, aspects of the method 1400 are performed by the self-propelled device. Further, the method 1400 can be performed by gates or circuits associated with a processor, Application Specific Integrated Circuit (ASIC), a field programmable gate array (FPGA), a system on chip (SOC), a neural processing unit, or other hardware device. Hereinafter, the method 1400 shall be explained with reference to the systems, components, modules, software, data structures, user interfaces, etc. described in conjunction with FIGS. 1-13.

The method 1400 starts at 1402 and proceeds to 1404, where the value of the new_color_reading variable and the value of the distance_traveled variable are enqueued into a color log. As previously mentioned, the color log may reside in the state/variable memory 414. The method 1400 then proceeds to 1406, where the color log is accessed from the most recent enqueued item to a maximum consideration distance (such as, but not limited to, one centimeter, two centimeters, three centimeters, etc.). For example, the color readings over the last two centimeters may be observed. The method may proceed to 1408, where a control system may determine if there is enough data (e.g., observed color readings) to span the maximum consideration distance. As an example, the control system may determine if there are at least two centimeters of readings. If the control system determines that there is enough data to span the maximum consideration distance, then the method may proceed to 1410 and calculate an instability measurement over the maximum consideration distance.

In examples, color instability may be generated based on any function that measures an amount of change, variance, fluctuation, etc. in readings over a distance. For example, the color instability value may be generated from one or more of: an area or volume of color space occupied by the readings over the considered travel distance; a size of the maximum color difference between any pair of readings over the considered travel distance; a size of the maximum color difference between any reading and the mean of all readings over the considered travel distance; a multi-dimensional standard deviation or variance in color over the considered travel distance; any closeness, clustering, etc. measure on color readings over the travel distance; and/or a frequency domain analysis of the color readings over the travel distance. Accordingly, a value of an instability variable may be generated and the method 1400 may proceed to 1414 and end.

In some examples, where there is not enough data to span the considered distance as determined at 1408, the method 1400 may proceed to 1412, set the value of the instability variable to zero and then proceed to 1414 to end. In examples, 1412 may occur when the self-propelled device is not moving or has not moved enough to determine a color instability over a traveled distance. For example, 1412 may be encountered at a start of a sequence when the self-propelled device is not moving and there are not enough readings in the color log to ensure a valid generation of instability. The method 1400 may proceed to 1414 and end following 1412.

Figure 15:
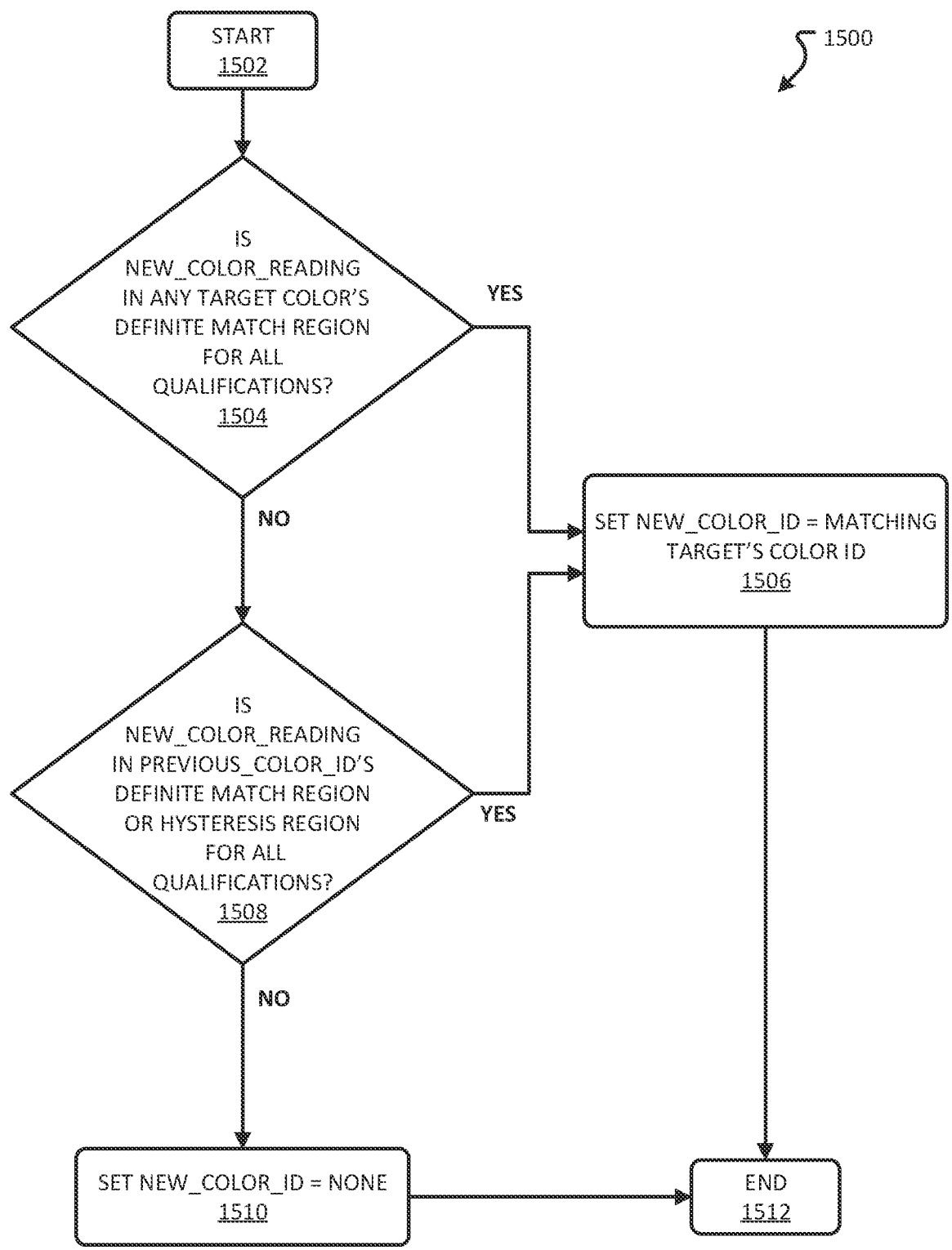
FIG. 15 depicts details of a method for obtaining a stabilized color using hysteresis in accordance with examples of the present disclosure.

FIG. 15 depicts details of a method 1500 for obtaining a stabilized color using hysteresis in accordance with examples of the present disclosure. In examples, the method 1500 may determine if a new color reading is in a match region of a target color based on the chromaticity, brightness, and chromaticity instability qualifications or if a new color reading is in a match region of the previously identified color or a hysteresis region of the previously identified color based on the chromaticity, brightness, and chromaticity instability qualifications. A general order for the steps of the method 1500 is shown in FIG. 15. Generally, the method 1500 starts at 1502 and ends at 1508. The method 1500 may include more or fewer steps or may arrange the order of the steps differently than those shown in FIG. 15. The method 1500 can be executed as a set of processor-executable instructions executed by a processor and encoded or stored on a computer-readable medium. In examples, aspects of the method 1500 are performed by the self-propelled device. Further, the method 1500 can be performed by gates or circuits associated with a processor, Application Specific Integrated Circuit (ASIC), a field programmable gate array (FPGA), a system on chip (SOC), a neural processing unit, or other hardware device. Hereinafter, the method 1500 shall be explained with reference to the systems, components, modules, software, data structures, user interfaces, etc. described in conjunction with FIGS. 1-14.

The method 1500 starts at 1502 and proceeds to 1504, where the control system may determine if the value of the new_color_reading variable is in a definite match region of any target color for all qualifications. The qualifications may refer to a chromaticity (e.g., hue, saturation, or similar measure), brightness (e.g., brightness value, lightness, luminance, or similar measurement), and a measure of chromaticity instability as previously discussed. For each qualification, every color target has a definite match region, a hysteresis region, and a definite mismatch region. As an example, a "red" color target would include a red chromaticity definite match region, a red chromaticity hysteresis region, a red chromaticity definite mismatch region, a red brightness definite match region, a red brightness hysteresis region, a red brightness definite mismatch region, a red chromaticity instability definite match region, a red chromaticity instability hysteresis region, and a red chromaticity instability definite mismatch region. In examples, the regions for chromaticity may be specified in two-dimensional areas, where as the regions for brightness and chromaticity instability may be specified in ranges of one dimensional values. Referring again to 1504, for a value of the new_color_reading variable to be in a target color's definite match region for all qualifications, the new_color_reading chromaticity value would be within the definite match region (e.g., region including a two-dimensional area of chromaticity) of the target color, the brightness value would be within the definite match region (range of one-dimensional brightness values) of the target color, and the chromaticity instability value would be within the definite match region (range of one dimensional chromaticity instability values) of the target color. Accordingly, if the new_color_reading variable is in a target color's definite match region for all qualifications, the value of the new_color_id variable may be set to the matching target color's identification (such as but not limited to, blue, red, or green) at 1506. The method 1500 may then proceed from 1506 to 1512 and end.

In some example, as the self-propelled device moves, noise in the optical sensor readings may cause one or more values of the new_color_reading variable to move in and out of a previous_color_id's definite match region and into and out of the previous_color_id's hysteresis region. Accordingly, at 1508, the control system may determine if the chromaticity, brightness, and chromaticity instability values for the new_color_reading variable are in a definite match region or hysteresis region for all qualifications of the previous_color_id. As an example, for chromaticity, brightness, and chromaticity instability values for the new_color_reading variable to be in the match region or hysteresis region of the previous_color_id, the chromaticity value for the new_color_reading variable would be in either the definite match region or the hysteresis region of the previous_color_id's chromaticity qualification, the brightness value for the new_color_reading variable would be in either the definite match region or the hysteresis region of the previous_color_id's brightness qualification, and chromaticity instability value for the new_color_reading variable would be in either the definite match region or the hysteresis region of the previous_color_id's chromaticity instability qualification. In instances where the chromaticity, brightness, and chromaticity instability values for the new_color_reading variable are in a definite match region or hysteresis region for all qualifications of the previous_color_id, the value of the new_color_id variable may be set to the matching target color's identification (such as but not limited to, blue, red, or green, etc.) at 1506. The method 1500 may then proceed from 1506 to 1512 and end.

If, at 1508, the method determines that the chromaticity, brightness, and chromaticity instability values for the new_color_reading variable are not in a definite match region or hysteresis region for all qualifications of the previous_color_id (e.g., at least one qualification is in a definite non-match region (e.g., definite mismatch region)), then the value of the new_color_id variable may be set to "None" at 1510 and the method 1500 may proceed to 1512, where the method 1500 may end.

Several variations and modifications of the disclosure can be used. It would be possible to provide for some features of the disclosure without providing others. The present disclosure, in various configurations and aspects, includes components, methods, processes, systems and/or apparatus substantially as depicted and described herein, including various combinations, subcombinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically. While the flowcharts have been discussed and illustrated in relation to a particular sequence of events, it should be appreciated that changes, additions, and omissions to this sequence can occur without materially affecting the operation of the disclosed configurations and aspects.

The present disclosure relates to a self-propelled device according to at least the examples provided in the sections below:

(A1) In one aspect, some examples are directed to a method for operating a self-propelled device. The method may include receiving, from an optical sensor of the self-propelled device, an indication of a surface color on which the self-propelled device operates, determining that a color transition has occurred from a first color to a second color based on the received indication, determining an activity associated with the second color, and performing the activity associated with the second color.

(A2) In some examples of A1, determining that the color transition occurred, includes: determining if color values received from the optical sensor are within a first area or within a second area in a color space; determining that the color transition occurred when the color values are within the first area; and determining that the color transition did not occur when the color values are within the second area.

(A3) In some examples of A1-A2, the method further includes determining a size of a color space occupied by a plurality of received color values; and determining that the color transition occurred when the color values are within the first area and when the size of the color space occupied by a plurality of received color values is less than a threshold.

(A4) In some examples of A1-A3, the second area is a hysteresis band surrounding the first area.

(A5) In some examples of A1-A4, the surface on which the self-propelled device operates is a tile on top of another surface.

(A6) In some examples of A1-A5, the method further includes: receiving a selection of the second color; and assigning the activity to the second color, wherein the activity causes the self-propelled device to at least one of move, turn, emit a sound from a speaker, and/or illuminate a light.

(A7) In some examples of A1-A6, the method further includes: generating a measure of instability for the indication of the surface color; and determining that the color transition has occurred to the second color based on the measure of instability being within an instability match region for the second color.

(B1) In another aspect, some examples are directed to a method for operating a self-propelled device. The method may include receiving, from an optical sensor of the self-propelled device, first color information for a surface color of a surface on which the self-propelled device operates; determining if the first color information is sufficiently stable to at least one of compare values of the first color information to match regions associated with a plurality of target colors or compare values of the first color information to a hysteresis region associated with a previously encountered color; comparing values of the first color information to a match region and a hysteresis region associated with the previously encountered color and determining that at least one value of the first color information is within the hysteresis region associated with the previously encountered color; receiving, from the optical sensor of the self-propelled device, second color information for another surface color of the surface on which the self-propelled device operates; determining if the second color information is sufficiently stable to at least one of compare values of the second color information to match regions associated with the plurality of target colors or compare values of the second color information to the hysteresis region associated with the previously encountered color; comparing values of the second color information to match regions associated with the plurality of target colors; based on a determination that one or more values of the second color information is within a match region associated with a matched color of the plurality of colors, determining an activity associated with the matched color; and causing the self-propelled device to perform the activity associated with the match color.

(B2) In some examples of B1, the values of the second color information include a chromaticity value, a brightness value, and a measure of chromaticity stability.

(B3) In some examples of B1-B2, the method includes receiving a selection of the second color; and assigning the activity to the second color, wherein the activity causes the self-propelled device to at least one of move, turn, emit a sound from a speaker, and/or illuminate a light.

(B4) In some examples of B1-B3, the surface on which the self-propelled device operates is a tile on top of another surface.

(C1) In yet another aspect, some examples are directed to a self-propelled device comprising an optical sensor configured to detect the color of the surface on which the self-propelled device operates; at least one motor coupled to a plurality of wheels; and a control system coupled to the optical sensor and the at least one motor, the control system being configured to perform any of the methods described herein (e.g., A1-A7 and B1-B4 described above).

(C2) In some examples of C1, the optical sensor includes at least one light-emitting diode and at least one photoelectric conversions device, the light-emitting diode configured to illuminate the surface and the at least one photoelectric conversion device configured to convert light reflected off of the surface.

(C3) In some examples of C1-C2, the control system is configured to receive an updated color and activity association and store the updated color and activity association in a table.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart or process. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for operating a self-propelled device, the method comprising:
   receiving, from an optical sensor of the self-propelled device, an indication of a surface color of a surface on which the self-propelled device operates;
   determining that a color transition has occurred from a first color to a second color based on the received indication, wherein determining that the color transition has occurred comprises:
      determining if color values received from the optical sensor are within a first area or within a second area in a color space;
      determining that the color transition occurred when the color values are within the first area; and
      determining that the color transition did not occur when the color values are within the second area;

determining an activity associated with the second color; and performing the activity associated with the second color.

2. The method of claim 1, further comprising:
determining a size of a color space occupied by a plurality of received color values; and
determining that the color transition occurred when the color values are within the first area and when the size of the color space occupied by a plurality of received color values is less than a threshold.

3. The method of claim 1, wherein the second area is a hysteresis band surrounding the first area.

4. The method of claim 1, wherein the surface on which the self-propelled device operates is a tile on top of another surface.

5. The method of claim 1, further comprising:
receiving a selection of the second color; and
assigning the activity to the second color, wherein the activity causes the self-propelled device to at least one of move, turn, emit a sound from a speaker, and illuminate a light.

6. The method of claim 1, further comprising:
generating a measure of instability for the indication of the surface color; and
determining that the color transition has occurred to the second color based on the measure of instability being within an instability match region for the second color.

7. A self-propelled device comprising:
an optical sensor configured to detect a color of a surface on which the self-propelled device operates;
at least one motor coupled to a plurality of wheels; and
a control system coupled to the optical sensor and the at least one motor, the control system configured to receive from the optical sensor, an indication of a surface color of a surface on which the self-propelled device operates, determine that a color transition has occurred from a first color to a second color based on the received indication, determine an activity associated with the second color, and performing the activity associated with the second color, and enable the at least one motor to move the self-propelled device, wherein the control system is further configured to perform operations comprising:
determine if color values received from the optical sensor are within a first area or within a second area in a color space;
determine that the color transition occurred when the color values are within the first area; and
determine that the color transition did not occur when the color values are within the second area.

8. The self-propelled device of claim 7, wherein the control system is configured to:
determine a size of a color space occupied by a plurality of received color values; and
determine that the color transition occurred when the color values are within the first area and when the size of the color space occupied by a plurality of received color values is less than a threshold.

9. The self-propelled device of claim 7, wherein the surface on which the self-propelled device operates is a tile on top of another surface.

10. The self-propelled device of claim 7, wherein the color space is divided into a plurality of different colors corresponding to a plurality of tiles.

11. The self-propelled device of claim 7, wherein the optical sensor includes at least one light-emitting diode and at least one photoelectric conversions device, the light-emitting diode configured to illuminate the surface and the at least one photoelectric conversion device configured to convert light reflected off of the surface.

12. The self-propelled device of claim 7, wherein the second area is a hysteresis band surrounding the first area.

13. The self-propelled device of claim 7, further comprising a processor configured to receive an updated color and activity association and store the updated color and activity association in a table.

14. The self-propelled device of claim 13, wherein the activity association is at least one of a move, turn, sound emitted from a speaker, and illuminated light.

15. The self-propelled device of claim 7, wherein the control system is configured to:
generate a measure of instability for the indication of the surface color; and
determine that the color transition has occurred to the second color based on the measure of instability being within an instability match region for the second color.

16. A non-transitory memory encoding computer executable instructions that, when executed by at least one processor, perform method for operating a self-propelled device, the method comprising:
receiving, from an optical sensor of the self-propelled device, an indication of a surface color of a surface on which the self-propelled device operates;
determining that a color transition has occurred from a first color to a second color based on the received indication;
determining if color values received from the optical sensor are within a first area or within a second area in a color space, wherein the second area is a hysteresis band surrounding the first area;
determining that the color transition occurred when the color values are within the first area; and
performing an activity based on the second color.

17. The non-transitory memory of claim 16, wherein the method further comprises:
determining a size of a color space occupied by a plurality of received color values; and
determining that the color transition occurred when the size of the color space occupied by a plurality of received color values is less than a threshold.

18. The non-transitory memory of claim 16, wherein the surface on which the self-propelled device operates is a tile on top of another surface.

19. The non-transitory memory of claim 16, wherein the method further comprises:
generating a measure of instability for the indication of the surface color; and
determining that the color transition has occurred to the second color based on the measure of instability being within an instability match region for the second color.

20. The non-transitory memory of claim 16, wherein the method further comprises:
receiving a selection of the second color; and
assigning the activity to the second color, wherein the activity causes the self-propelled device to at least one of move, turn, emit a sound from a speaker, and illuminate a light.

* * * * *